US008639659B2

(12) United States Patent
Ishihara et al.

(10) Patent No.: US 8,639,659 B2
(45) Date of Patent: Jan. 28, 2014

(54) METHOD ENABLING COLLABORATIVE EDITING OF OBJECT IN CONTENT DATA, COMPUTER SYSTEM, AND COMPUTER PROGRAM PRODUCT

(75) Inventors: Tatsuya Ishihara, Kanagawa (JP); Shin Saito, Kanagawa (JP)

(73) Assignee: International Business Machines Corporation, Armonk, NY (US)

( * ) Notice: Subject to any disclaimer, the term of this patent is extended or adjusted under 35 U.S.C. 154(b) by 254 days.

(21) Appl. No.: 13/118,647

(22) Filed: May 31, 2011

(65) Prior Publication Data

US 2011/0296317 A1 Dec. 1, 2011

(30) Foreign Application Priority Data

May 31, 2010 (JP) ................................ 2010-124795

(51) Int. Cl.
*G06F 17/30* (2006.01)

(52) U.S. Cl.
USPC ........... 707/610; 707/611; 707/617; 707/618; 707/620

(58) Field of Classification Search
CPC ................................ G06F 17/30; G06F 17/00
See application file for complete search history.

(56) References Cited

U.S. PATENT DOCUMENTS

| | | | | |
|---|---|---|---|---|
| 6,442,483 | B1 * | 8/2002 | Doglione | 701/300 |
| 6,765,498 | B1 * | 7/2004 | Sabatino | 340/945 |
| 7,743,064 | B2 * | 6/2010 | Faulkner et al. | 707/758 |
| 7,774,388 | B1 * | 8/2010 | Runchey | 707/811 |
| 7,991,754 | B2 * | 8/2011 | Maizel et al. | 707/705 |
| 8,185,567 | B2 * | 5/2012 | Mitchell | 707/827 |
| 8,230,467 | B2 * | 7/2012 | Faulkner et al. | 725/86 |
| 8,250,613 | B2 * | 8/2012 | Faulkner et al. | 725/86 |
| 8,265,871 | B1 * | 9/2012 | Starns et al. | 701/451 |
| 8,271,992 | B2 * | 9/2012 | Chatley et al. | 718/105 |
| 8,332,375 | B2 * | 12/2012 | Chatley et al. | 707/705 |
| 8,346,768 | B2 * | 1/2013 | Bailor et al. | 707/729 |
| 2005/0246373 | A1 * | 11/2005 | Faulkner et al. | 707/104.1 |
| 2005/0257240 | A1 * | 11/2005 | Faulkner et al. | 725/92 |

(Continued)

FOREIGN PATENT DOCUMENTS

| | | | |
|---|---|---|---|
| JP | 20020041506 | A | 2/2002 |
| JP | 2002140344 | A | 5/2002 |

(Continued)

OTHER PUBLICATIONS

Shen et al., A log Compression Algorithm for Operation-based Version Control Systems. Proceedings of the 26th Annual International COmputer Software and Applications Conference, 2002. pp. 867-872.

(Continued)

*Primary Examiner* — Farhan Syed
(74) *Attorney, Agent, or Firm* — Cantor Colburn LLP

(57) ABSTRACT

A program product and a method with which a server computer enables an object in content data to be edited collaboratively. The server computer is connectable through a network to a first client computer associated with a first user and a second client computer associated with a second user. In addition, the present invention provides a method that enables an object in content data to be edited collaboratively by a first client computer associated with a first user and a second client computer associated with a second user. The present invention provides a system and a program product as well.

18 Claims, 21 Drawing Sheets

(56) References Cited

U.S. PATENT DOCUMENTS

| | | | | |
|---|---|---|---|---|
| 2005/0257241 | A1* | 11/2005 | Faulkner et al. | 725/92 |
| 2009/0138480 | A1* | 5/2009 | Chatley et al. | 707/10 |
| 2009/0313215 | A1* | 12/2009 | Maizel et al. | 707/3 |
| 2010/0146114 | A1* | 6/2010 | Morris | 709/225 |
| 2010/0146132 | A1* | 6/2010 | Morris | 709/229 |
| 2010/0257457 | A1* | 10/2010 | De Goes | 715/751 |
| 2011/0231416 | A1* | 9/2011 | Goodchild Drake | 707/754 |
| 2011/0231483 | A1* | 9/2011 | Derraugh et al. | 709/203 |
| 2011/0289150 | A1* | 11/2011 | Westaway et al. | 709/205 |
| 2012/0136895 | A1* | 5/2012 | Johnson | 707/776 |
| 2012/0158746 | A1* | 6/2012 | Johnson et al. | 707/748 |
| 2012/0265436 | A1* | 10/2012 | Tkachenko | 701/438 |
| 2013/0013414 | A1* | 1/2013 | Haff | 705/14.64 |

FOREIGN PATENT DOCUMENTS

| | | | |
|---|---|---|---|
| JP | 20060113958 | A | 4/2006 |
| JP | 20060163912 | A | 6/2006 |
| JP | 3915331 | B | 5/2007 |
| JP | 20070328489 | A | 12/2007 |
| JP | 20080165299 | A | 7/2008 |
| JP | 20090009410 | A | 1/2009 |
| WO | WO2006-051905 | A | 5/2006 |

OTHER PUBLICATIONS

Aguido et al., Generalizing Operational Transformation to the Standard General Markup Language, Proceedings of the 2002 ACM Conference on Computer Supported Cooperative Work, 2002. pp. 58-67.

Google. Google Docs Tour. Available at http://www.google.com/google-d-s/intl/en/tour1.html. May 6, 2010.

Google. Share and Collaborate in Real Time. Available at http://www.google.com/google-d-s/intl/en/tour2.html. May 6, 2010.

Wikipedia. Operational Transformation—Wikipedia, the free encyclopedia. Available at http://en.wikipedia.org/wiki/operational_transformation. May 6, 2010.

Wang et al., Google Wave Operational Transformation, Google Wave Federation Protocol. Available athttp://www.waveprotocol.org/whitepapers/operational-transform. May 6, 2010.

* cited by examiner

METHOD ENABLING COLLABORATIVE EDITING OF OBJECT IN CONTENT DATA, COMPUTER SYSTEM, AND COMPUTER PROGRAM PRODUCT

CROSS-REFERENCE TO RELATED APPLICATION

This application claims priority under 35 U.S.C. §119 from Japanese Patent Application No. 2010-124795 filed May 31, 2010, the entire contents of which are incorporated herein by reference.

BACKGROUND OF THE INVENTION

The present invention relates to a method which enables collaborative editing of an object in content data as well as a computer system and a computer program product.

Web-based office software (hereinafter, referred to as Web office software) is one of web applications which support collaborative document editing. Examples of the Web office software include Google (trademark) Docs, Zoho (trademark) Office (Zoho Docs, Zoho Sheet, Zoho Show, and Zoho Writer) and OpenGoo. In the Web office software, multiple users can collaboratively edit data through a network, and a server performs centralized control over data being edited by the users.

However, enabling the collaborative editing, the Web office software involves the following problems: (1) A certain object that a user does not wish his/her collaborator (any other user) to edit can be edited by the collaborator. (2) For example, Google Docs provides a function of protecting a part of a sentence, but the function prevents editing by users other than a main user.

SUMMARY OF THE INVENTION

The Web office software is required to have a function of allowing a user to designate an object that the user does not wish the other users to edit, but not the function of preventing editing by the other users.

The present invention provides a method with which a server computer (hereinafter, also referred to as a server) enables an object in content data to be edited collaboratively (see FIG. 7A).

The server is connectable through a network to a first client computer (hereinafter, first client) associated with a first user and a second client computer (hereinafter, second client) associated with a second user. The method includes the steps executed by the server of:

in response to a designation of an object made by the first user as an object that the second user is not allowed to edit, receiving information identifying the designated object from the first client (see FIG. 7A (the same applies to the following steps)) (701);

after receiving the information identifying the designated object, receiving change instruction data from the second client and storing the received change instruction data in the storage, the change instruction data indicating an instruction to change the designated object by the second user (702 to 703);

generating branch data of the designated object in response to reception of the change instruction data from the second client (704);

after receiving the information identifying the designated object, receiving, from the first client, change instruction data indicating an instruction to change the designated object by the first user, storing the received change instruction data in the storage, and updating the branch data by reflecting an operation according to the change instruction data received from the first client (705 to 706);

judging, by using operational transformation, whether it is possible to merge a sequence of operations (hereinafter, a first operation sequence) according to the change instruction data received from the first client, with a sequence of operations (hereinafter, a second operation sequence) according to the change instruction data received from the second client (709); and if the merging is possible, applying the first operation sequence to the content data of the second user by using operational transformation (710).

The present invention also provides a method that enables an object in content data to be edited collaboratively by a first client and a second client (see FIG. 7B). In the method, the first client includes a first storage that stores therein change instruction data indicating an instruction to change the object by the first user. The second client includes a second storage that stores therein change instruction data indicating an instruction to change the object by the second user.

The method includes the steps executed by the second client:

in response to a designation of an object made by the first user as an object that the second user is not allowed to edit, receiving information identifying the designated object from the first client (see FIG. 7B (the same applies to the following steps)) (722);

storing change instruction data in the second storage after receiving the information identifying the designated object, the change instruction data indicating an instruction to change the designated object by the second user; and transmitting the change instruction data to the first client (723), the method further comprising the steps executed by the first client of:

generating branch data of the designated object in the first storage in response to initial reception of the change instruction data from the second client (724);

after receiving the information identifying the designated object, storing in the first storage change instruction data indicating an instruction to change the designated object by the first user, and updating the branch data by reflecting an operation according to the change instruction data received from the first client (725);

judging, by using operational transformation, whether it is possible to merge a sequence of operations (hereinafter, a first operation sequence) according to the change instruction data received from the first client, with a sequence of operations (hereinafter, a second operation sequence) according to the change instruction data received from the second client (727); and if the merging is possible, transmitting the first operation sequence to the second client (728);

the method further including the step further executed by the second client of:

applying the first operation sequence to the content data of the second user by using operational transformation in response to reception of the first operation sequence (729).

In an embodiment of the present invention, the method further includes the step executed by the first client of deleting the branch data after the step of transmitting the first operation sequence to the second client.

The present invention also provides a method that enables an object in content data to be edited collaboratively by a first client and a second client (see FIG. 7C). In the method, the first client includes a first storage that stores therein change instruction data indicating an instruction to change the object by the first user. The second client includes a second storage that stores therein change instruction data indicating an instruction to change the object by the second user.

The method includes the steps executed by the second client:

in response to a designation of an object made by the first user as an object that the second user is not allowed to edit, receiving information identifying the designated object from the first client (see FIG. 7C (the same applies to the following steps) (742);

storing in the second storage change instruction data indicating an instruction to change the designated object by the second user;

generating branch data of the designated object in the second storage in response to initial generation of an instruction to change the designated object by the second user and updating the branch data by reflecting an operation according to the change instruction data (746); and in response to the initial generation of the instruction to change the designated object by the second user, transmitting, to the first client, data indicating that the designated object is changed (744), the method further including the step executed by the first client of, in response to reception of the data indicating that the designated object is changed, transmitting, to the second client, change instruction data indicating the instruction to change the designated object by the first user (745), the method further including the steps executed by the second client of:

judging, by using operational transformation, whether it is possible to merge a sequence of operations (a first operation sequence) according to the change instruction data received from the first client, with a sequence of operations (a second operation sequence) according to the change instruction data received from the second client (747); and if the merging is possible, transmitting the first operation sequence to the first client (748), the method further including the step further executed by the first client of:

applying the first operation sequence transmitted from the second client to the content data of the second user by using operational transformation (749).

In an embodiment of the present invention, the method further comprises the steps executed by the first user of:

in response to an instruction by the first user to display the content data edited by the second user, displaying the content data edited by the second user; and showing the first user a magnitude of a difference between the first operation sequence and the second operation sequence, wherein the step of applying the first operation sequence is executed in accordance with an instruction by the first user.

The present invention also provides a server which enables an object in content data to be edited collaboratively, the server (see FIGS. 3A and 3B (the same applies to the following description) (301) is connectable through a network to a first client (302*a*) associated with a first user and a second client (302*b*) associated with a second user, the server comprises:

a first receiver which receives, in response to a designation of an object made by the first user as an object that the second user is not allowed to edit, information identifying the designated object from the first client;

a second receiver which receives, after receiving the information identifying the designated object, from the second client, change instruction data indicating an instruction to change the designated object by the second user;

a generating unit (305) which generates branch data of the designated object in response to reception of the change instruction data from the second client;

a third receiver which receives, after receiving the information identifying the designated object, from the first client, change instruction data indicating an instruction to change the designated object by the first user, a storage (304) which stores therein the change instruction data received from the second client, the change instruction data received from the first client, and the branch data, the storage further updating the branch data by reflecting an operation according to the change instruction data received from the first client;

a judging unit (306) which judges, by using operational transformation, whether it is possible to merge a sequence of operations (a first operation sequence) according to the change instruction data received from the first client, with a sequence of operations (a second operation sequence) according to the change instruction data received from the second client; and an applying unit (307) which applies, if the merging is possible, the first operation sequence to the content data of the second user by using operational transformation. The first receiver, the second receiver, and the third receiver can be integrated into a single receiver (303).

Another embodiment of the present invention provides a computer readable storage medium tangibly embodying a computer readable program code having computer readable instructions which when implemented, cause a computer to carry out the steps of a method including:

receiving information identifying a designated object from a first client in response to a designation of an object made by a first user as an object that a second user is not allowed to edit;

receiving change instruction data from a second client and storing the received change instruction data in a storage of the server, the change instruction data indicating an instruction to change the designated object by the second user;

generating branch data of the designated object in response to reception of the change instruction data from the second client;

receiving change instruction data indicating an instruction to change the designated object by the first user from the first client;

storing the received change instruction data in the storage;

updating the branch data by reflecting an operation according to the change instruction data received from the first client;

judging, by using operational transformation, whether it is possible to merge a first sequence of operations according to the change instruction data received from the first client, with a second sequence of operations according to the change instruction data received from the second client; and applying the first operation sequence to the content data of the second user by using operational transformation if the merging is possible.

DETAILED DESCRIPTION OF THE PREFERRED EMBODIMENTS

Figure 1:
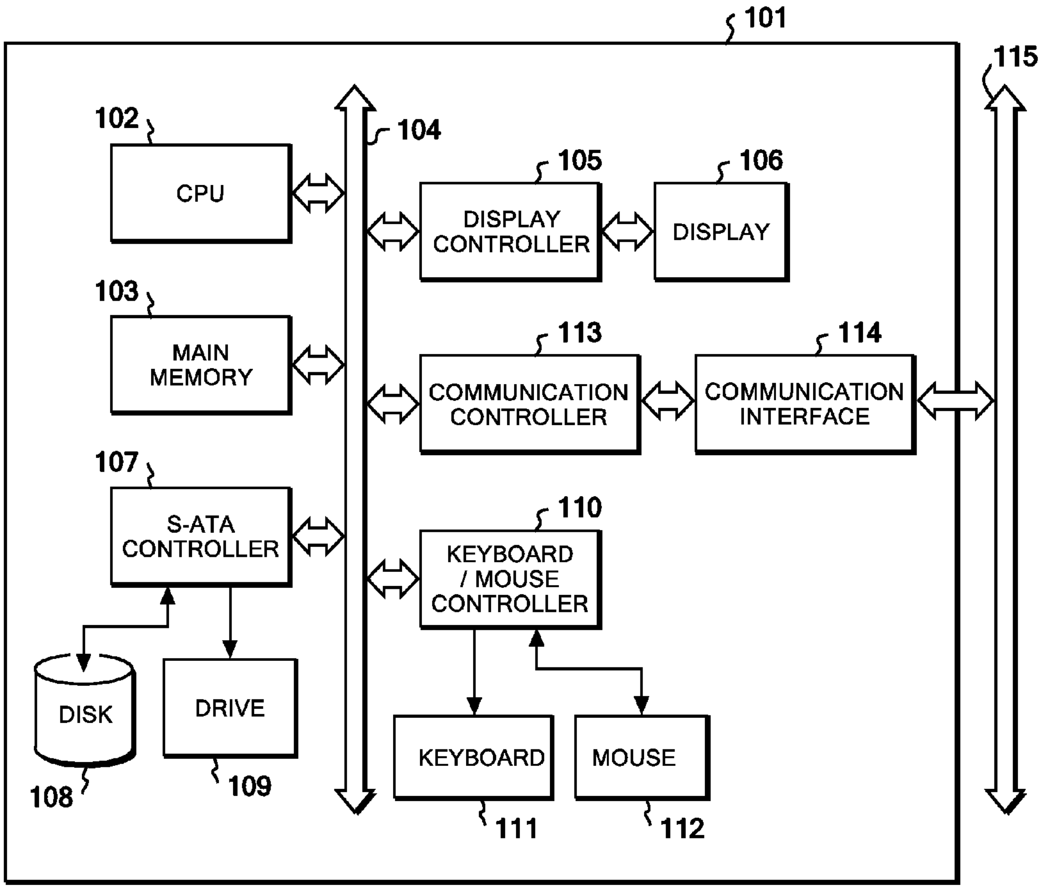
FIG. 1 shows a basic block diagram of computer hardware common to a server and clients in an embodiment of the present invention.

In an embodiment of the present invention, "content data" is data generated through a network by using an application allowing collaborative editing by multiple users. The content data is, for example, data used in: word processor software or text editor software; spreadsheet software; presentation software; database software; or message collaboration software, but is not limited thereto.

In the embodiment of the present invention, an "object" is to be edited in the content data by a user. The object is: for example, a character, a character string, a figure, or a combination thereof; a page; a (work) sheet; or a slide, but is not limited thereto. The sheet is, for example, a sheet used in spreadsheet software. The slide is, for example, a slide used in presentation software. Any "object" can be designated by information for identifying the object. The information for identifying the object is an identifier (ID), for example.

In the embodiment of the present invention, a "server computer" (hereinafter, also referred to as a server) is connected to a client computer through a network which is, for example, the Internet, an extranet or intranet, or a combination thereof.

In the embodiment of the present invention, a "client computer" (hereinafter, also referred to as a client) can be any device as long as it is capable of editing content data through the network. The client is, for example, a personal computer, a personal digital assistant, or a mobile phone, but is not limited thereto. In addition, in the embodiment of the present invention, a first client and a second client can be virtual client computers implemented in a client computer which is the same hardware. The virtual client computers are thin clients, for example.

In the embodiment of the present invention, a "network" is, for example, the Internet, an extranet, intranet, or a combination thereof. In addition, the "network" includes various connection relationships between the server and thin clients.

In the embodiment of the present invention, a "first user" is a user who designates an object that a second user (also referred to as any other user) other than the first user is not allowed to edit.

In the embodiment of the present invention, a "first client" is a client operated by the first user. The first client is used to collaboratively edit the content data.

In the embodiment of the present invention, a "second user" is a user other than the first user. Specifically, if a user is a user who designates an object that any other user is not allowed to edit, the user can be a first user. If not, the user can be a second user. In other words, the user can be any of the first user and the second user.

In the embodiment of the present invention, a "second client" is a client operated by the second user. The second client is used to collaboratively edit the content data.

In the embodiment of the present invention, "collaborative editing" is editing the content data by at least two users of the respective client computers.

In the embodiment of the present invention, a "designated object" refers to as an object designated as an object that any other user is not allowed to edit. The object that any other user is not allowed to edit is an object that the first user does not wish a second user to edit and is designated by the first user.

In the embodiment of the present invention, "designated-object-identifying information" is information for identifying a designated object. The designated-object-identifying information can be expressed, for example, by an identifier of the object (object ID) or a path to an XML element, or in a proprietary data format.

In the embodiment of the present invention, "change instruction data" is data indicating an instruction to change an object by a user. The change instruction data can be expressed in, for example, XML, JSON (Java Script Object Notation), or a proprietary data format.

In the embodiment of the present invention, an "operation sequence according to change instruction data" is a sequence of operations (also referred to as an operation sequence) according to change instruction data (for example, see FIG. 6 below). The operation sequence includes at least one operation. In this embodiment of the present invention, a "first operation sequence" is an operation sequence according to change instruction data received from a first client. In the embodiment of the present invention, a "second operation sequence" is an operation sequence according to change instruction data received from a second client.

In the embodiment of the present invention, to "merge" is to apply an operation sequence of a first client to data of a second client, to make the data of the second client identical to data of the first client, and then to delete branch data of the first client.

Operational transformation will be described later by referring to FIGS. 4A, 4B, and 5 below.

Figure 8:
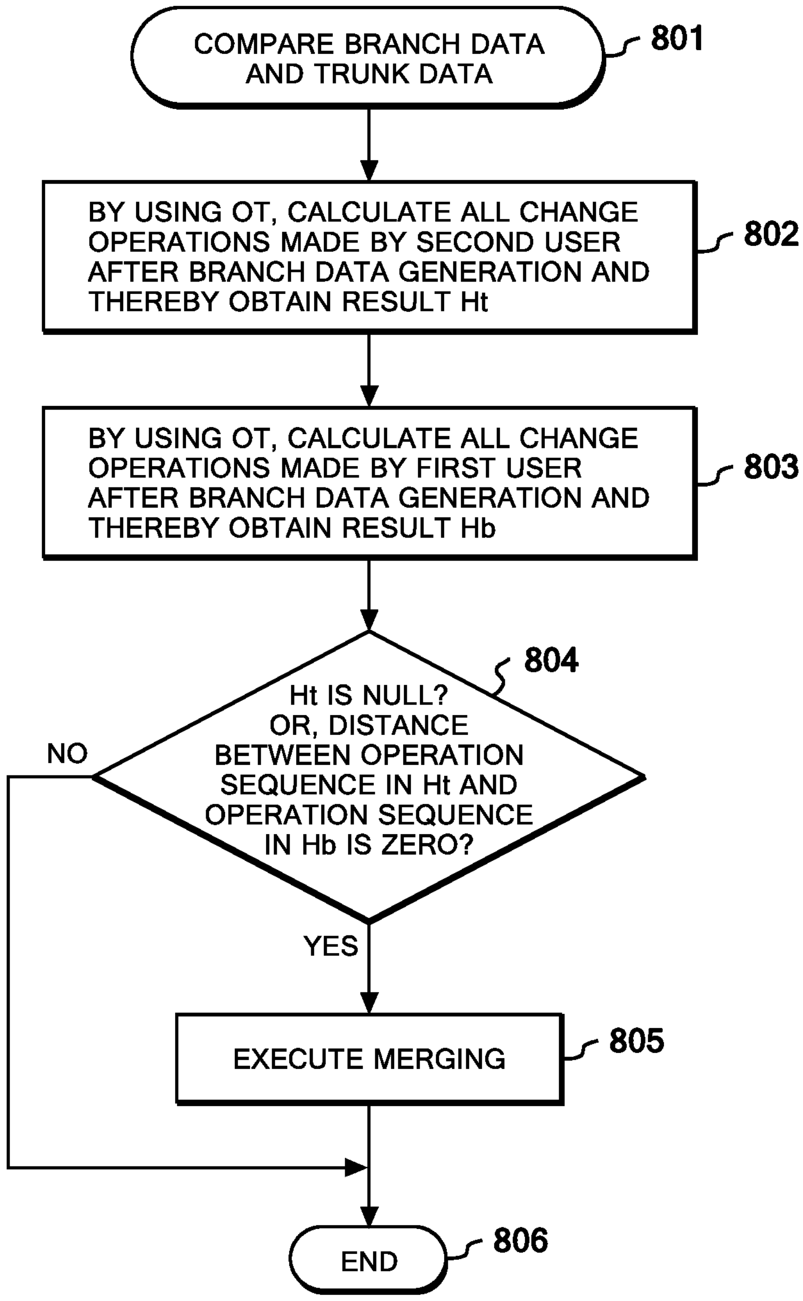
FIG. 8 is a flowchart of a comparison process in Step 616 in FIG. 6, which is the embodiment of the present invention.

In an embodiment of the present invention, the merging is possible when Ht is null, Ht being a result of calculating, by using operational transformation, whole the second operation sequence performed after the generation of the branch data of the designated object (see FIG. 8, 804).

In another embodiment of the present invention, the merging is possible when a distance between Ht and Hb is zero, Ht being a result of calculating, by using operational transformation, whole the second operation sequence performed after the generation of the branch data of the designated object, Hb being a result of calculating, by using operational transformation, whole the first operation sequence performed after the generation of the branch data of the designated object (804).

In an embodiment of the present invention, the method further comprises the step executed by the server of deleting, from the storage, the branch data and the change instruction data received from the first client, the deleting executed after the step of applying the first operation sequence.

In an embodiment of the present invention, the step of judging comprises the step executed by the server of providing a user interface with data on a magnitude of a difference between the first operation sequence and the second operation sequence, the user interface being provided for showing the first user the magnitude of the difference.

In an embodiment of the present invention, the method further comprises the steps executed by the server of:

receiving change instruction data from the first client before the designated object is designated, the change instruction data indicating an instruction to change the object by the first user; and synchronizing the content data of the second user by using the received change instruction data.

In an embodiment of the present invention, after the branch data of the designated object is generated, the branch data and the change instruction data from the first client are stored in a first buffer of the storage, and the change instruction data from the second client is stored in a second buffer in the storage.

In an embodiment of the present invention, the server further includes a buffer controller (308) that deletes the branch data and the change instruction data received from the first client, from the storage after the application of the first operation sequence.

In an embodiment of the present invention, the server further includes a provision unit (309) that provides a user interface with data on the magnitude of the difference between the first operation sequence and the second operation sequence, the user interface being provided for showing the first user the magnitude of the difference.

In an embodiment of the present invention, the server receives change instruction data indicating an instruction to change an object by the first user before the designated object is designated. The server updates the content data of the second user for synchronization by using the received change instruction data.

According to the present invention, each user can designate a part of content data that the user does not wish any other user to change, on an object basis without preventing the other users from editing the other parts. This makes it possible to efficiently perform collaborative editing.

The present invention also makes it possible for all the users in collaborative editing to freely edit any object in content data without the need for awareness of whether or not a target object is protected.

In addition, in a case where there are many collaborators, the present invention makes it possible for each of the users to cope with an unexpected change by one of the other users.

The present invention is effective to the following case, for example. Attendants at an interactive meeting such as brain storming freely exchange their opinions by using slides. Each of the attendants does not wish the other attendants to edit his/her opinion on the slide, but wishes to share as much the same contents as possible with each other.

The present invention is also effective to the following case, for example. Students share a material of a lecture of e-learning and are permitted free writing in the material of the lecture. Each of the students does not wish the other students to change his/her memorandum in the material, but wishes to share as much the same contents as possible with each other.

The embodiment of the present invention will be described by referring to the attached drawings. It should be understood that this embodiment is provided for merely explaining a preferable embodiment of the present invention and is not intended to limit the scope of the present invention to one described herein. Throughout the figures below, the same reference numeral is given to the same component unless otherwise stated throughout the drawings.

FIG. 1 shows a basic block diagram of computer hardware common to a server computer and client computers in an embodiment of the present invention. Hereinafter, the server computer and the client computers are collectively referred to as a computer.

A computer (101) includes a CPU (102) and a main memory (103) which are connected to a bus (104). The CPU (102) is preferably based on a 32-bit or 64-bit architecture, and can employ, for example, Core i (trademark) series, Core 2 (trademark) series, Atom (trademark) series, Xeon (trademark) series, Pentium (trademark) series, and Celeron (trademark) series, of Intel Corporation, Phenom (trademark) series, Athlon (trademark) series, Turion (trademark) series, and Sempron (trademark) of Advanced Micro Devices, Inc. A display (106), such as a liquid crystal display (LCD) monitor, can be connected to the bus (104) through a display controller (105). In order to manage the computer (101), the display (106) is used for displaying, with an appropriate graphic interface, information on the computer (101) connected to a network through a communication line (115) and information on software operating on the computer (101). A disk (108), for example, a hard disk or a silicon disk, and a drive (109), for example, a CD-ROM, DVD, or BD drive can also be connected to the bus (104) through a S-ATA or IDE controller (107). A keyboard (111) and a mouse (112) can further be connected to the bus (104) through a keyboard/mouse controller (110) or a USB bus (not shown).

The disk (108) stores an operating system, a program providing a Java (registered trademark) processing environment such as J2EE, other programs, and data, so as to be loadable onto the main memory (103).

The drive (109) is used, as needed, to install a program from a CD-ROM, a DVD-ROM, or a BD to the disk (108).

A communication interface (114) complies with, for example, the Ethernet (registered trademark) protocol, and is connected to the bus (104) through a communication controller (113). The communication interface (114) plays a role of physically connecting the computer (101) with the communication line (115), and provides a network interface layer to the TCP/IP communication protocol which is a communication function of the operating system of the computer (101). The communication line (115) can be configured as a wired LAN environment, or as a wireless LAN environment which is based on wireless LAN connection standards, such as IEEE 802.11a/b/g/n, for example.

Figure 2A:
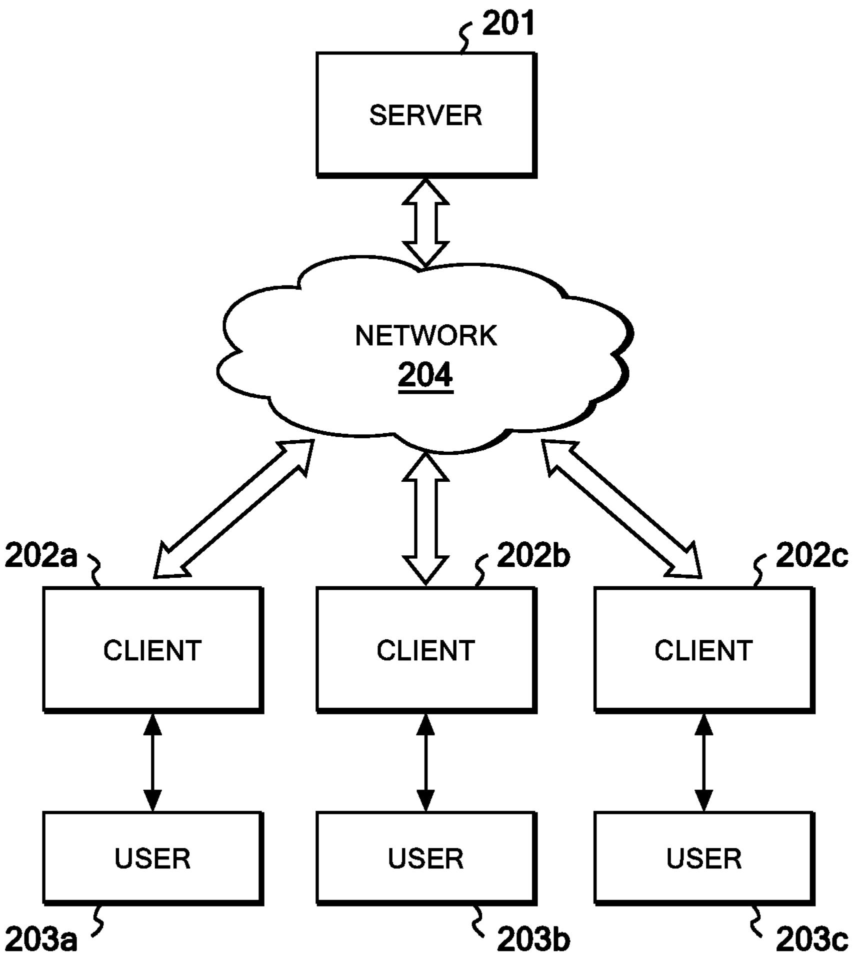
FIG. 2A shows a relationship among a server and clients in the embodiment of the present invention.
Figure 2B:
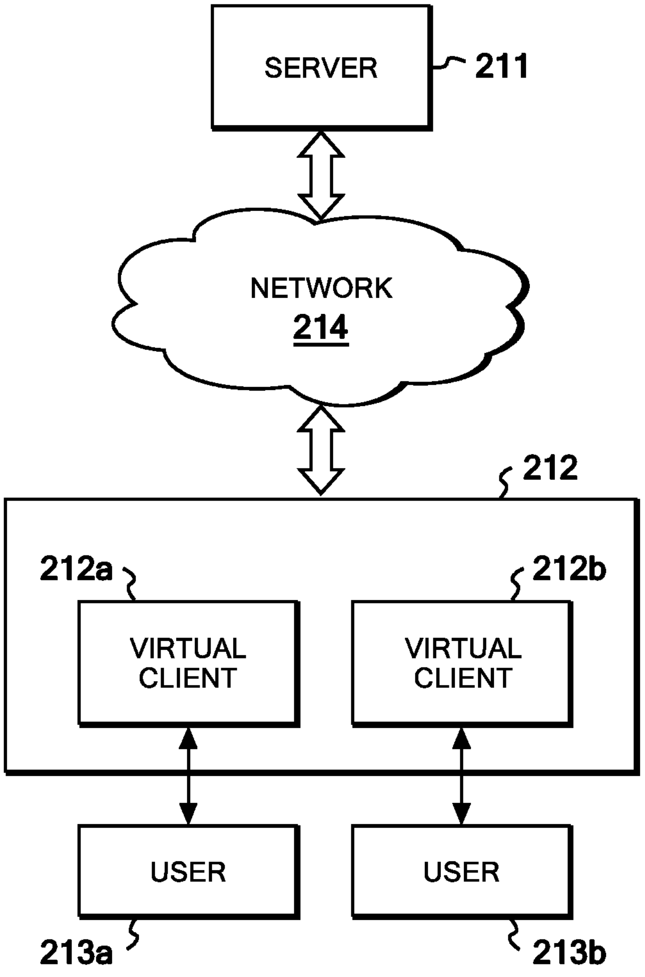
FIG. 2B shows a relationship among a server and clients in the embodiment of the present invention.
Figure 2C:
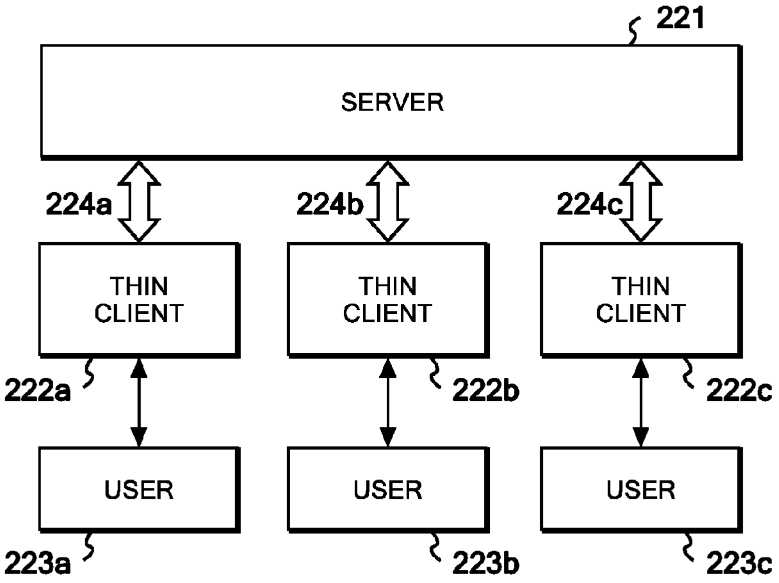
FIG. 2C shows a relationship among a server and clients in the embodiment of the present invention.
Figure 2D:
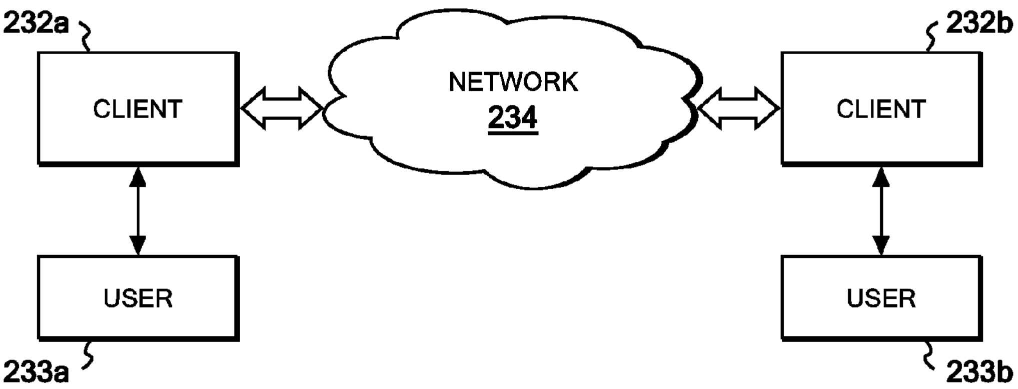
FIG. 2D shows a relationship between clients in the embodiment of the present invention.

FIGS. 2A to 2C show relationships among a server and clients in the embodiment of the present invention. FIG. 2D shows a relationship between clients in the embodiment of the present invention.

FIG. 2A shows that a server (201) is connected to clients (202*a* to 202*c*) through a network (204).

The clients (202*a* to 202*c*) can be operated by users (203*a* to 203*c*), respectively. Note that the three clients are shown in FIG. 2A, but the number of the clients can be two, or more than three.

FIG. 2B shows that a server (211) is connected to a client (212) through a network (214).

The client (212) implements virtual clients (212*a* and 212*b*). The virtual clients (212*a* and 212*b*) can implement the same operating system or different operating systems, respectively. The virtual clients (212*a* and 212*b*) can be operated by users (213*a* and 213*b*), respectively. Note that the two virtual clients are shown in FIG. 2B, but the number of the clients can be three or more.

FIG. 2C shows that the server (221) is connected to thin clients (222*a* to 222*c*) through respective networks (224*a* to 224*c*).

The thin clients (222*a* to 222*c*) can be operated by users (223*a* to 223*c*), respectively. Note that the three thin clients are shown in FIG. 2C, but the number of the thin clients can be two, or more than three.

FIG. 2D shows that a client (232*a*) is connected to a client (232*b*) through a network (234).

FIG. 2D shows an example in which the server is not required. The clients (232*a* and 232*b*) can be operated by users (233*a* and 233*b*), respectively. Note that the two clients are shown in FIG. 2D, but the number of clients can be more than two.

The present invention can be implemented in any of a server-client network environment as shown in FIGS. 2A to 2C and a client-client network environment without a server as shown in FIG. 2D.

Figure 3A:
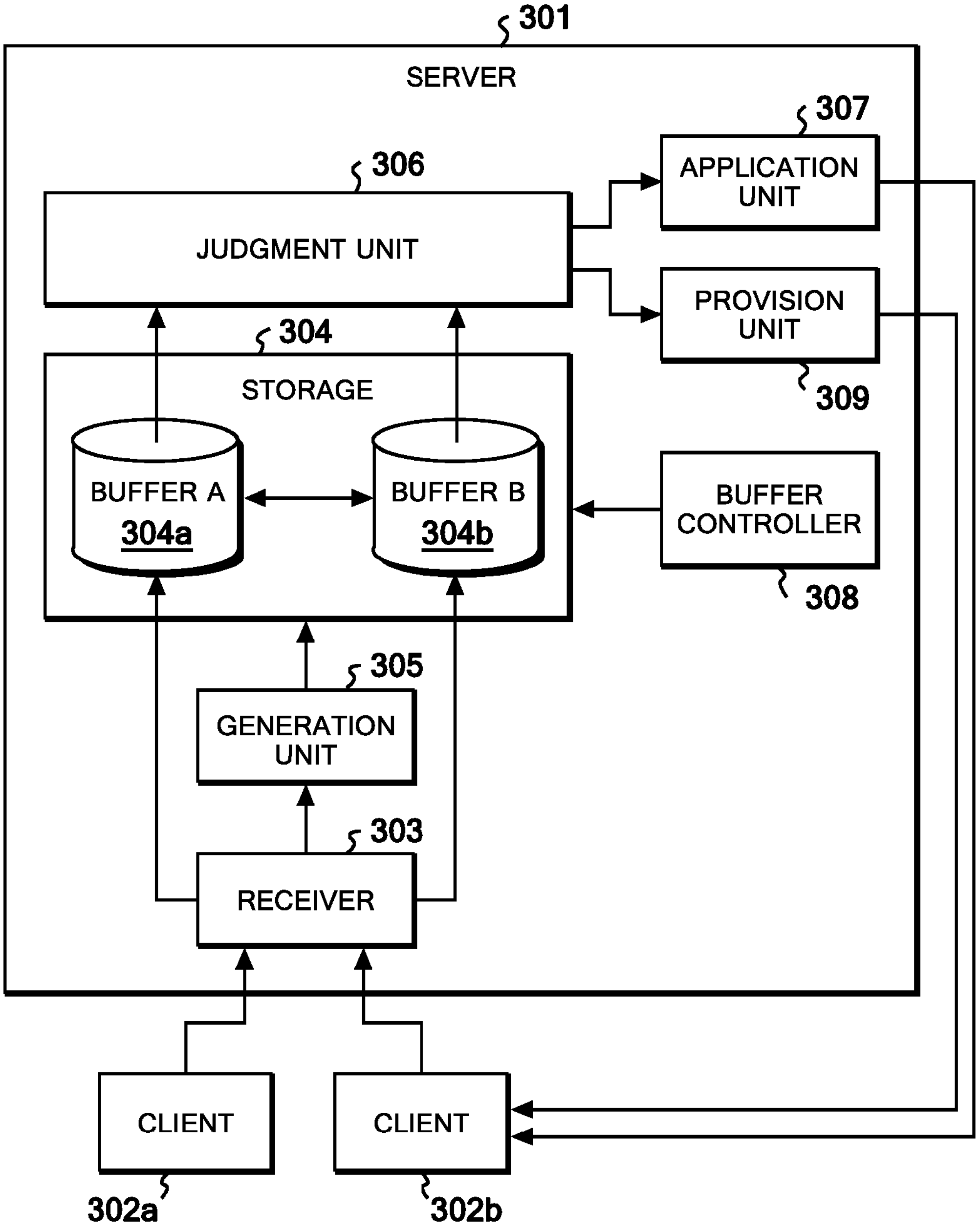
FIG. 3A shows a block configuration diagram of the servers shown in FIGS. 2A to 2C, in the embodiment of the present invention.

FIG. 3A shows a block diagram of the servers shown in FIGS. 2A to 2C, in the embodiment of the present invention.

A server (301) is connected to clients (302*a* and 302*b*). The server (301) includes a receiver (303), a storage (304), a generation unit (305), a judgment unit (306), and an application unit (307). The server (301) can also include a buffer controller (308). The server (301) can further include a provision unit (309).

The receiver (303) receives designated-object-identifying information from one of the client (302*a*) and the client (302*b*). The receiver (303) also receives change instruction data from the client (302*a*) and/or the client (302*b*).

The storage (304) can include a buffer A (304*a*) and a buffer B (304*b*). The buffers A and B (304*a* and 304*b*) can be provided in different storages. The buffers A and B (304*a* and 304*b*) can be a cache, for example. The storage (304) stores therein trunk data and branch data. “Trunk” and “branch” are terms used in version management. Trunk data is data which is a trunk in collaborative editing, while branch data is branched from the trunk data and is a copy of a designated object.

Suppose a case where the storage (304) is provided with the buffer A (304*a*) and the buffer B (304*b*). When the buffer A (304*a*) is a second buffer and the buffer B (304*b*) is a first buffer, the buffer A (304*a*) stores trunk data therein and the buffer B (304*b*) stores branch data. Alternatively, when the buffer A (304*a*) is the first buffer and the buffer B (304*b*) is the second buffer, the buffer A (304*a*) stores branch data and the buffer B (304*b*) stores trunk data.

For example, when the buffer A (304*a*) stores trunk data and the buffer B (304*b*) stores branch data, the client (302*a*) is the second client and the client (302*b*) is the first client. In this case, the buffer A (304*a*) further stores change instruction data from the client (302*a*), and the buffer B (304*b*) further stores change instruction data from the client (302*b*). In addition, a user who operates the client (302*a*) is the second user, and a user who operates the client (302*b*) is the first user in this case.

Moreover, for example, when the buffer A (304*a*) stores branch data and the buffer B (304*b*) stores trunk data, the client (302*a*) is the first client and the client (302*b*) is the second client. In this case, the buffer A (304*a*) further stores change instruction data from the client (302*a*), and the buffer B (304*b*) further stores change instruction data from the client (302*b*). In addition, a user who operates the client (302*a*) is the first user, and a user who operates the client (302*b*) is the second user in this case.

The generation unit (305) generates branch data in the storage (304) in response to initial reception of change instruction data on a certain designated object from the second client.

The judgment unit (306) judges, by using operational transformation, whether or not it is possible to merge changes made by the first client (also referred to as first changes) which are accumulated in the first buffer with changes made by the second client (also referred to as second changes) which are accumulated in the second buffer. operational transformation will be described with reference to FIGS. 4A, 4B, and 5 later.

If the merging is possible, the application unit (307) applies a first operation sequence to content data of the second user by using operational transformation.

The buffer controller (308) deletes, from the storage (304), the branch data and the change instruction data received from the first client, after the application unit (307) applies the first operation sequence to the content data of the second user. When the storage (304) is provided with the buffers A and B (304*a* and 304*b*), the buffers A and B (304*a* and 304*b*) themselves can be configured to be cleared in which the branch data and the change instruction data from the first client are stored.

The provision unit (309) provides data on the magnitude of a difference between the first operation sequence and the second operation sequence to a user interface for showing the first user the magnitude of the difference.

The basic configuration of the clients (302*a* and 302*b*) is as shown in FIG. 1. The client (302*a*) can be the first client, and the client (302*b*) can be the second client. Alternatively, the client (302*a*) can be the second client and the client (302*b*)

can be the first client. Each of the clients (302*a* and 302*b*) can be the first client or the second client. Which one of the clients (302*a* and 302*b*) serves as the first client or the second client depends on which one of the users of the clients (302*a* and 302*b*) has the right to designate an object that any other user is not allowed to edit. In other words, if one of the users of the clients (302*a* and 302*b*) has the right to designate an object that any other user is not allowed to edit, the client is the first client and the other client is the second client. Whether or not the user of the client has the right to designate an object that any other user is not allowed to edit is judged based on whether or not the user is the owner of the data, or has the right to manage the data. Specifically, if the user of the client (302*a*) has the right to designate an object that any other user is not allowed to edit, the client (302*a*) is the first client. If not, the client (302*a*) is the second client. The client (302*a*) can be any of the first client and the second client. The same holds for the client (302*b*).

Figure 3B:
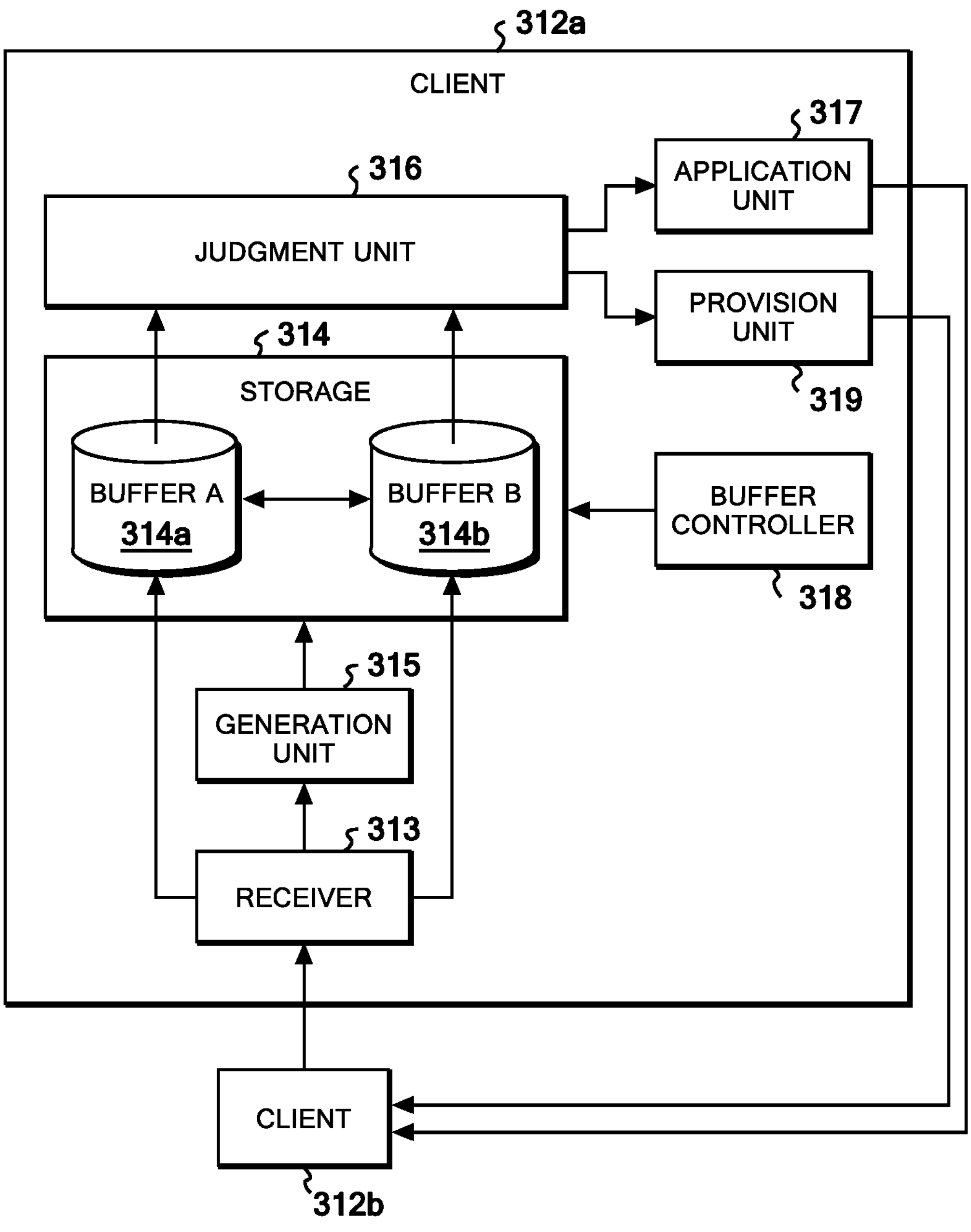
FIG. 3B shows a block configuration diagram of the client shown in FIG. 2D, in the embodiment of the present invention.

FIG. 3B shows a block configuration diagram of the client shown in FIG. 2D, in the embodiment of the present invention.

A client (312*a*) is connected to a client (312*b*). The client (312*a*) includes a receiver (313), a storage (314), a generation unit (315), a judgment unit (316), and an application unit (317). The client (312*a*) can also include a buffer controller (318). The client (312*a*) can further include a provision unit (319).

The receiver (313) receives designated-object-identifying information from the client (312*b*). The receiver (313) also receives change instruction data from the client (312*b*).

The storage (314) can include a buffer A (314*a*) and a buffer B (314*b*). The storage (314) stores therein trunk data and branch data.

Suppose a case where the storage (314) is provided with the buffer A (314*a*) and the buffer B (314*b*). When the buffer A (314*a*) is a second buffer and the buffer B (314*b*) is a first buffer, the buffer A (314*a*) stores trunk data therein and the buffer B (314*b*) stores branch data. Alternatively, when the buffer A (314*a*) is the first buffer and the buffer B (314*b*) is the second buffer, the buffer A (314*a*) stores branch data and the buffer B (314*b*) stores trunk data.

For example, when the buffer A (314*a*) stores trunk data and the buffer B (314*b*) stores branch data, the client (312*a*) is the second client and the client (312*b*) is the first client. In this case, the buffer A (314*a*) further stores change instruction data from the client (312*a*), and the buffer B (314*b*) further stores change instruction data from the client (312*b*). In addition, a user who operates the client (312*a*) is the second user, and a user who operates the client (312*b*) is the first user in this case.

Moreover, for example, when the buffer A (314*a*) stores branch data and the buffer B (314*b*) stores trunk data, the client (312*a*) is a first computer and the client (312*b*) is a second computer. In this case, the buffer A (314*a*) further stores change instruction data from the client (312*a*), and the buffer B (314*b*) further stores change instruction data from the client (312*b*). In addition, the client (312*a*) is the first user, and the client (312*b*) is the second user in this case.

The generation unit (315) generates branch data in the storage (314*a*) in response to initial reception of change instruction data on a certain designated object from the second client.

The judgment unit (316) judges, by using operational transformation, whether or not it is possible to merge changes made by the first client (also referred to as first changes) which are accumulated in the first buffer with changes made by the second client (also referred to as second changes) which are accumulated in the second buffer.

If the merging is possible, the application unit (317) applies a first operation sequence to content data of the second user by using operational transformation.

The buffer controller (318) deletes, from the storage (314), the branch data and the change instruction data received from the first client, after the application unit (317) applies the first operation sequence to the content data of the second user. When the storage (314) is provided with the buffers A and B (314*a* and 314*b*), the buffers A and B (314*a* and 314*b*) themselves can be configured to be cleared in which the branch data and the change instruction data from the first client are stored.

The provision unit (319) provides data on the magnitude of a difference between the first operation sequence and the second operation sequence to a user interface for showing the first user the magnitude of the difference.

The basic configuration of the clients (312*a* and 312*b*) is as shown in FIG. 1. The client (312*a*) can be the first client, and the client (312*b*) can be the second client. Alternatively, the client (312*a*) can be the second client and the client (312*b*) can be the first client. Each of the clients (312*a* and 312*b*) can be the first client or the second client. Which one of the clients (312*a* and 312*b*) serves as the first client or the second client depends on which one of the users of the clients (312*a* and 312*b*) has the right to designate an object that any other user is not allowed to edit. In other words, if one of the users of the clients (312*a* and 312*b*) has the right to designate an object that any other user is not allowed to edit, the client is the first client and the other client is the second client. Whether or not the user of the client has the right to designate an object that any other user is not allowed to edit is judged based on whether or not the user is the owner of the data, or has the right to manage the data. Specifically, if the user of the client (312*a*) has the right to designate an object that any other user is not allowed to edit, the client (312*a*) is the first client. If not, the client (312*a*) is the second client. The client (312*a*) can be any of the first client and the second client. The same holds for the client (312*b*).

Figure 4A:
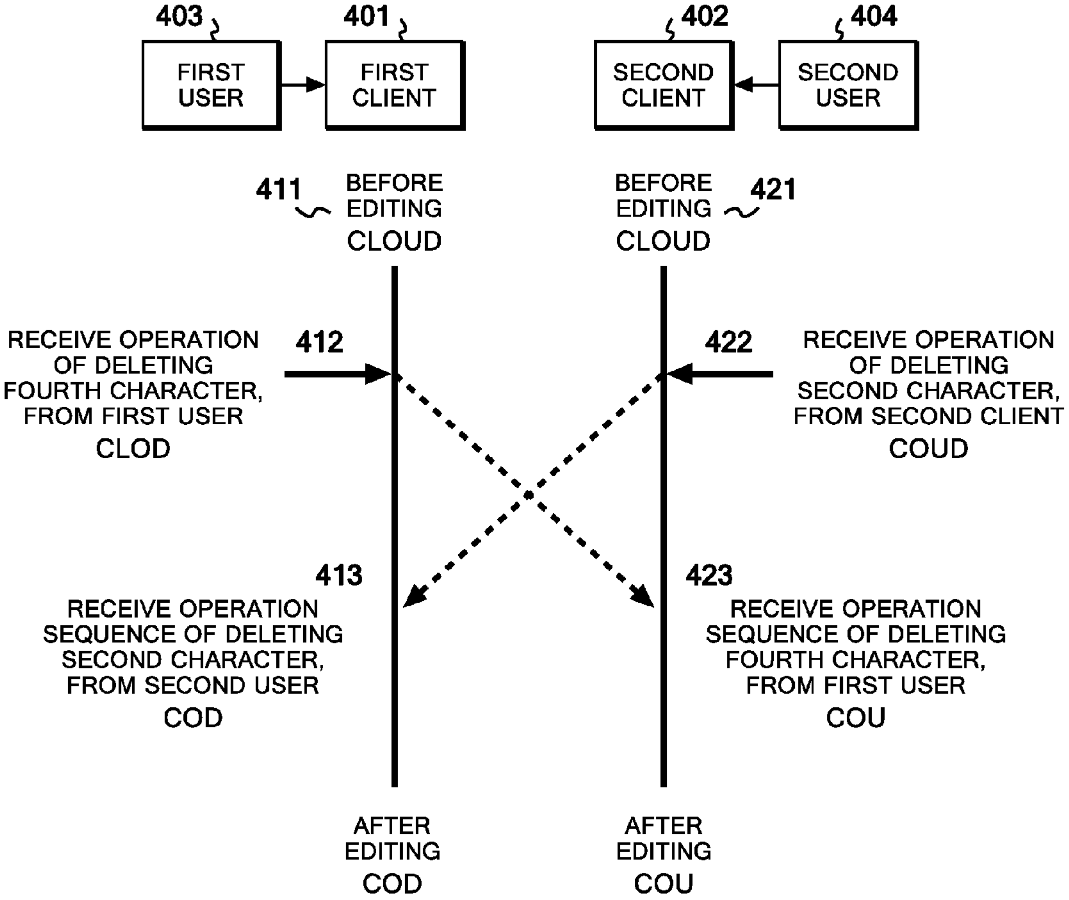
FIG. 4A shows an example of synchronization failure in transmission and reception of operation sequences in a case where the same document is edited by a first client and a second client.
Figure 4B:
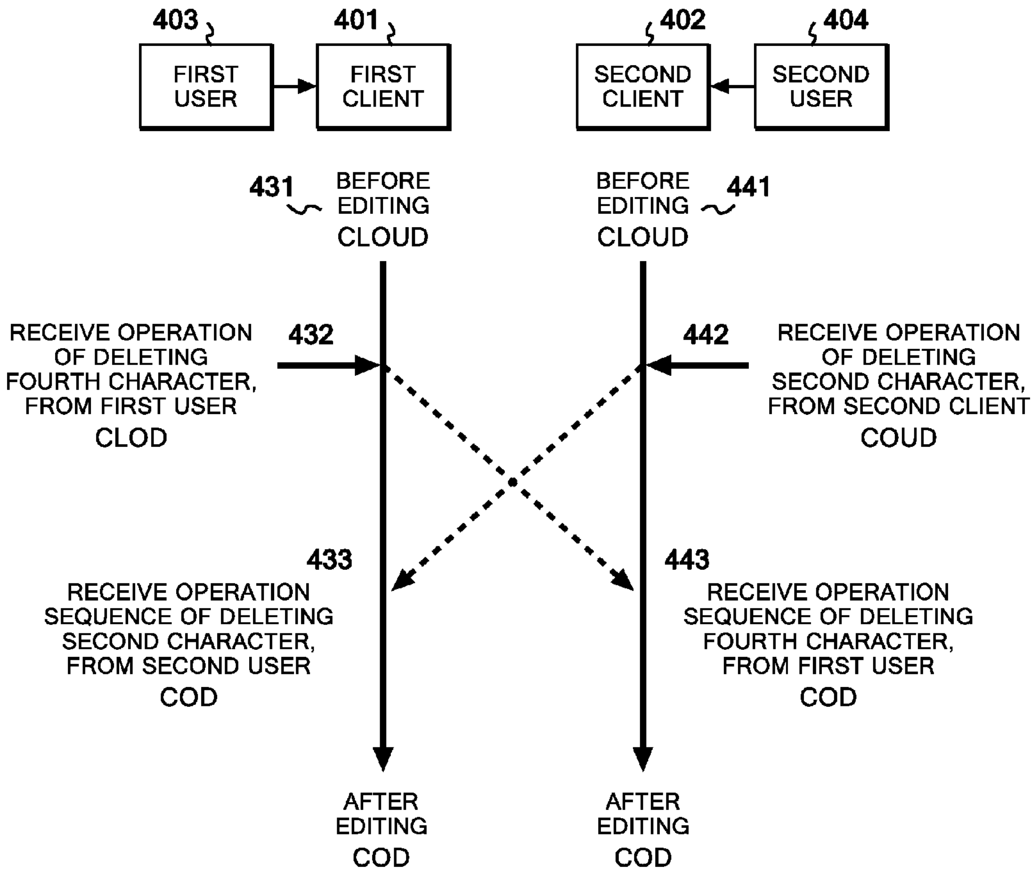
FIG. 4B shows an example in which operational transformation is applied to the example in FIG. 4A so that data is synchronized.
Figure 5:
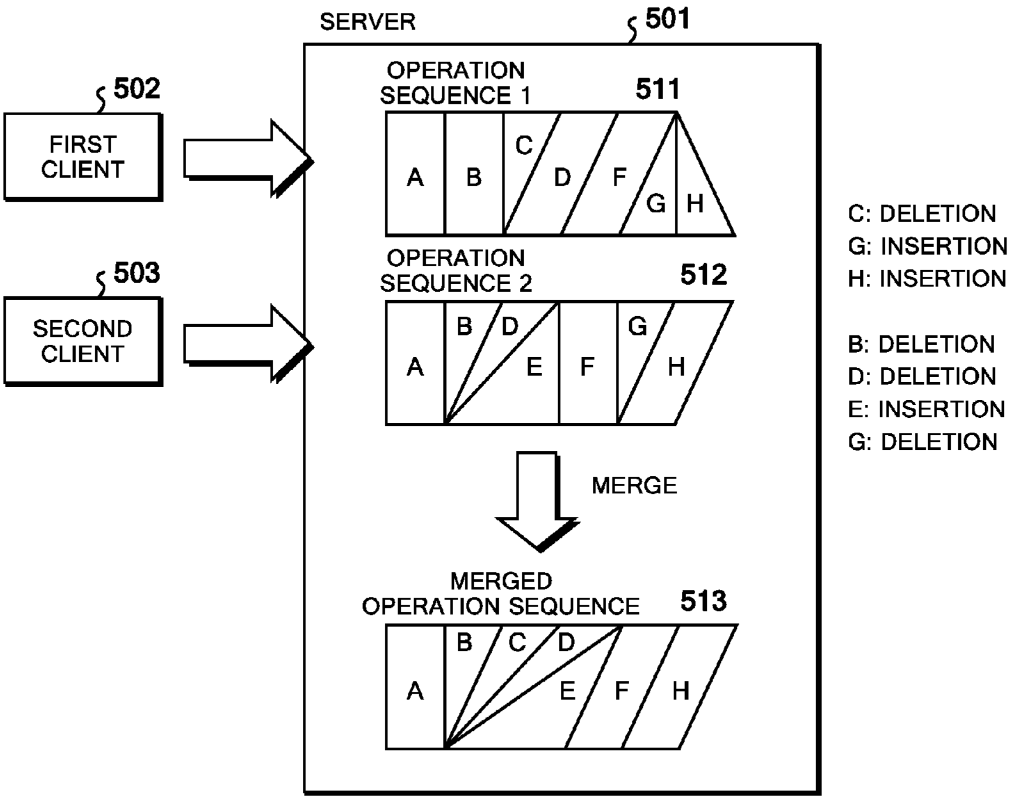
FIG. 5 shows an example in which operational transformation is applied to merge two operation sequences together.

FIGS. 4A, 4B, and 5 are provided for easy understanding of general OPERATIONAL TRANSFORMATION contents.

Symbols used for operational transformation will be defined as below.

(1) An i-th operation in an operation sequence H is denoted by H[i].

(2) The number of operations in the operation sequence H is denoted by |H|.

(3) An operation O included in the operation sequence H has information described in (A) to (L) below.

(A) O.t denotes the type of an operation in a document.

If O.t=ins, an operation O is an operation of inserting a character string.

If O.t=del, an operation O is an operation of deleting a character string.

(B) O.p denotes the position of a document at which an operation is applied.

If O.t=ins and O.p=1, a character is inserted behind the first character in the document.

If O.t=del and O.p=3, the third character in the document is deleted.

(C) O.len denotes the length of a character string to be changed in the document. The change includes an insertion of a character in the document and a deletion of a character in the document.

An insertion of a character string "abc" into the document is expressed by O.len=3.

(D) O.s denotes a character string to be inserted into, or to be deleted from the document.

An insertion of a character string "abc" into the document is expressed by O.s="abc".

(E) A notation O1⊥O2 denotes that operations occur on documents which are in the same condition. In other words, this shows that two operations O1 and O2 are in a context equivalent relationship. Any context equivalent relationship needs to be transformed by operational transformation into an operation which is not context equivalent.

(F) A notation O1→O2 denotes that the operation O1 has occurred before the operation O2. Since an impact by the operation O1 has already been included in the operation O2, OPERATIONAL TRANSFORMATION is not required.

(G) A notation O1|→O2 denotes that the operation O1 has occurred before the operation O2 and that a state after the operation O1 has been executed is a state before the operation O2 has been executed. In other words, the two operations O1 and O2 are in a context preceding relationship.

(H) A notation IT(Ob, Oa) denotes that a new operation Ob' is generated by including an impact of an operation Oa in an operation Ob, IT standing for Inclusion Transformation.

If Oa⊥Ob, Oa|→Ob' holds true.

(I) A notation ET(Ob, Oa) denotes that an impact by the operation Oa is eliminated from the operation Ob, ET standing for Exclusion Transformation.

(J) A notation SWAP(Ob, Oa) denotes that if Oa|→Ob, operations Oa' and Ob' to be in Ob'|→Oa' are generated. SWAP is performed by combining IT and ET.

(K) A notation MERGE(Ob, Oa) denotes that two operations Oa' and Ob' are generated which are to be in Oa'|→Ob' if Oa|→Ob and whose operation target positions do not overlap with each other.

(L) A notation H1·H2 denotes that histories H1 and H2 of respective two operations are combined with each other.

Detailed descriptions are given below of SWAP ((J) above) and MERGE ((K) above).

(a) SWAP

If O1|→O2, operations which are to be in O2'|→O1' are obtained by the following operation.

```
SWAP(O1, O2) {
  O2' = ET(O2, O1);
  O1' = IT(O1, O2');
  return(O2', O1');
}
```

(b) MERGE

If O1|→O2, operations which are to be in O1'|→O2' and whose operation target positions do not overlap with each other are obtained by the following operation.

An algorithm for MERGE is described in Haifeng Shen, Chengzheng Sun, "A Log Compression Algorithm for Operation-based Version Control Systems," Computer Software and Applications Conference, Annual International, p. 867, 26th Annual International Computer Software and Applications Conference, 2002).

FIG. 4A shows an example of synchronization failure in transmission and reception of operation sequences in a case where the same document is edited by a first client and a second client.

In order to support collaborative editing with Web office software, a first client (401) and a second client (402) exchange their respective operation sequences with each other.

The first client (401) receives an operation for editing a document by a first user (403) and transmits an operation sequence thereof to the second client (402) through a network.

The second client (402) receives an operation for editing the document by a second user (404) and transmits an operation sequence thereof to the first client (401) through the network.

However, as shown in the example in FIG. 4A, some data can not be synchronized between the first client (401) and the second client (402).

In Step 411 and Step 421, the first user (403) and the second user (404) each start editing of "CLOUD" which is the same content provided thereto.

In Step 412, the first client (401) receives an operation of deleting the fourth character from the first user (403). Thus, "CLOUD" is changed to "CLOD." On the other hand, in Step 422, the second client (402) receives an operation of deleting the second character from the second user (404). Thus, "CLOUD" is changed to "COUD."

Subsequently, in Step 413, the first client (401) receives from the second client (402) an operation sequence of deleting the second character having performed in Step 422. Thus, "CLOD" is changed to "COD." On the other hand, in Step 423, the second client (402) receives from the first client (401) an operation sequence of deleting the fourth character having performed in Step 412. Thus, "COUD" is changed to "COU."

Consequently, the first client (401) has the editing result of "COD," while the second client (402) has the editing result of "COU." Accordingly, there is no consistency in content between the first client (401) and the second client (402).

As described above, the synchronization fails in transmission and reception of the operation sequences in the example in FIG. 4A.

FIG. 4B shows an example in which operational transformation is applied to the example in FIG. 4A so that data is synchronized.

In Step 431 and Step 441, the first user (403) and the second user (404) each start editing of "CLOUD" which is the same content provided thereto.

In Step 432, the first client (401) receives an operation of deleting the fourth character from the first user (403). Thus, "CLOUD" is changed to "CLOD." On the other hand, in Step 442, the second client (402) receives an operation of deleting the second character from the second user (404). Thus, "CLOUD" is changed to "COUD."

Subsequently, in Step 433, the first client (401) receives from the second client (402) an operation sequence of deleting the second character having performed in Step 442. Since it is judged by using operational transformation that this operation received from the second client (402) does not have an impact of the operation of deleting the fourth character in Step 432, the operation is executed as it is. Thus, "CLOD" is changed to "COD." On the other hand, in Step 443, the second client (402) receives from the first client (401) an operation sequence of deleting the fourth character having performed in Step 432. It is judged by using operational transformation that this operation received from the first client (401) has an impact of the previous operation of deleting the second character (Step 442). Subsequently, the operation is transformed by using OPERATIONAL TRANSFORMATION from the operation of deleting the fourth character to an operation of deleting the third character and then executed. Thus, "COUD" is changed to "COD."

Consequently, both the first client (401) and the second client (402) have the editing results of "COD." Accordingly, there is consistency in content between the first client (401) and the second client (402).

As described above, the synchronization succeeds in transmission and reception of the operation sequences in the example in FIG. 4B by using operational transformation.

FIG. 5 shows an example in which operational transformation is applied to merge two operation sequences together.

Suppose a case where a server (501) receives an operation sequence 1 (511) and an operation sequence 2 (512) from a first client (502) and a second client (503), respectively.

The operation sequence 1 (511) is formed by operations A to D and F to H. Reference letter C denotes a deletion operation; G and H each denote an insertion operation.

The operation sequence 2 (512) is formed by operations A, B, and D to H. Reference letters B, D, and G each denote a deletion operation; E denotes an insertion operation.

When the operation sequence 1 (511) and the operation sequence 2 (512) are merged together by applying operational transformation thereto, G (insertion) in the operation sequence 1 (511) is consequently deleted due to G (deletion) in the operation sequence 2 (512). An operational sequence (513) obtained by merging the operation sequence 1 (511) and the operation sequence 2 (512) together is formed by operations A to F and H. Reference letters B, C and D each denote a deletion operation, and E denotes an insertion operation. Consequently, the operation sequence obtained merging by using operational transformation includes the operations A to F and H. If the operation sequence 1 (511) and the operation sequence 2 (512) are merged together and then the resultant single operation sequence (513) is executed, the same result is obtained.

Furthermore, the merging makes it possible to reduce data to be transmitted and received.

Figure 6:
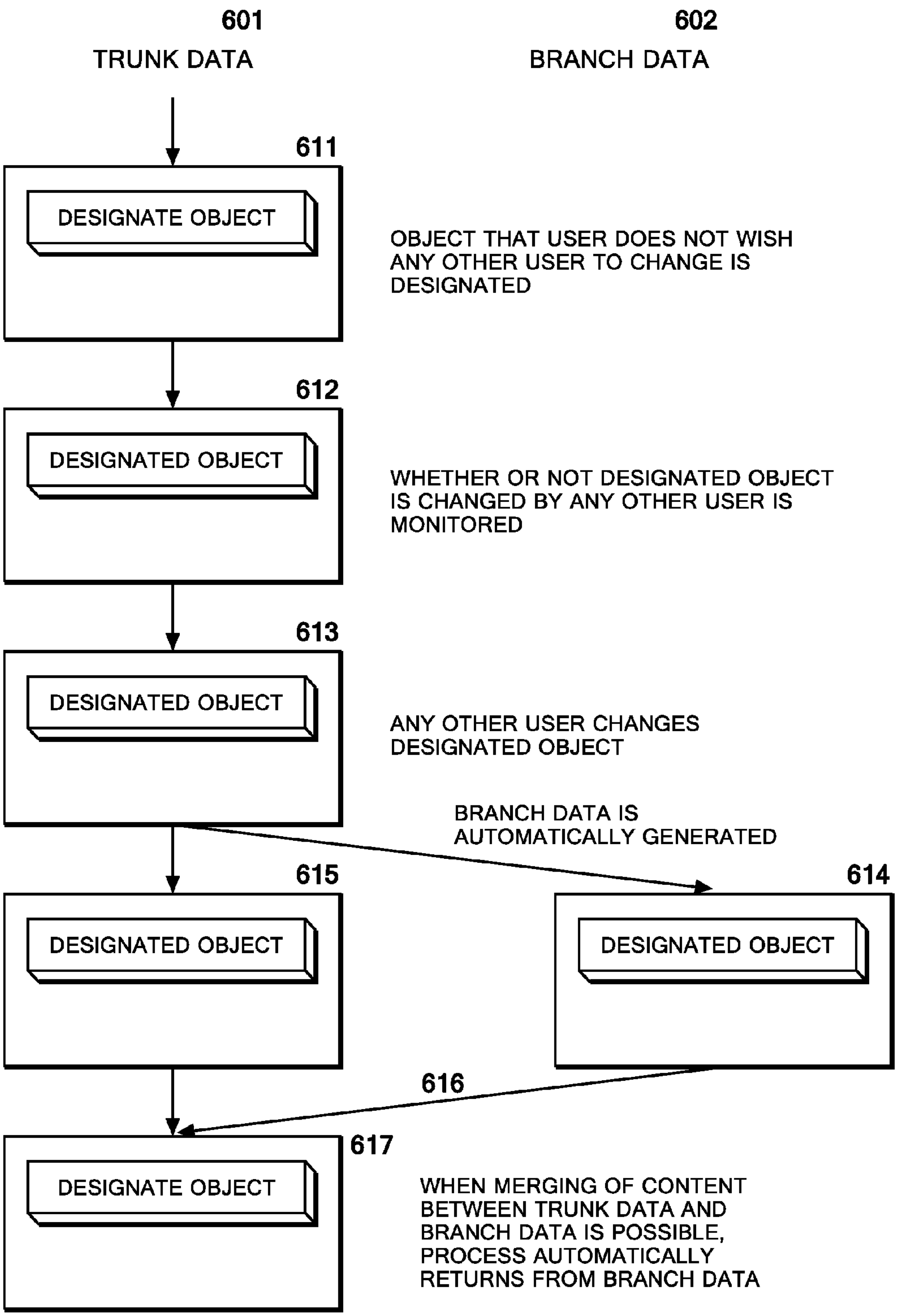
FIG. 6 is a flowchart showing a relationship between trunk data and branch data, which is the embodiment of the present invention.

FIG. 6 is a flowchart showing a relationship between trunk data and branch data, which is the embodiment of the present invention.

Steps in FIG. 6 are executed mainly by hardware which compares content between branch data (602) and trunk data (601). In such a system having the server-client relationship as shown in FIGS. 2A to 2C and FIG. 3A, the steps in FIG. 6 are executed mainly by a server. In a system having the client-client relationship as shown in FIGS. 2D and 3B, the steps in FIG. 6 are executed mainly by either the first client or the second client which is the aforementioned hardware for the comparison. The same holds for FIGS. 8 and 10 to 15.

A description is given below by taking as an example the case of the system in the server-client relationship shown in FIGS. 2A to 2C and 3A, but does not exclude the case of the system in the client-client relationship as shown in FIGS. 2D and 3B. The description is given on the assumption that, in a server-client environment shown in FIG. 3A, the client (302*a*) is a first client, and the client (302*b*) is a second client. The client (302*a*) and the client (302*b*) are connected to the server (301) through the network. The first client (302*a*) is operated by the first user, while the second client (302*b*) is operated by the second user. As the second client, a single or multiple clients can be provided.

In Step 611, the first user uses the first client to designate an object that the first user does not wish any other user (that is, the second user) to edit. The designation can be made by selecting a range with the mouse or a cursor or an item from the menu. Items include, for example, a title, characters, and graphics. The first client transmits designated-object-identifying information to the server. The server receives the designated-object-identifying information from the first client and then stores the designated-object-identifying information in the memory of the server. The designated-object-identifying information can be, for example, an identifier of an object. The designated-object-identifying information can be stored as a file on a single content-data-piece basis, or can be collectively stored on a multiple content-data-piece basis.

In Step 612, the server monitors whether or not the second user changes the designated object. The monitoring is performed based on data indicating an instruction to change the object, the data being transmitted from the second client. The data indicating an instruction to change the object includes, for example, an object ID and information on an operation to be performed on the object designated by the ID. Specifically, in a case of changing the color of a certain object, data indicating an instruction to change the object includes the ID of the object and a color newly set for the object. While the second user does not change the designated object, data indicating an instruction to change the object by the first user is transmitted to the server, and trunk data (601) in the memory in the server is changed (because branch data has not been generated yet at this point as described below). As described above, trunk data is data which serves as a trunk for collaborative editing.

In Step 613, the server detects that the second user changes the designated object.

In Step 614, in response to the detection above, the server automatically generates branch data (602) of the designated object subjected to the change, in the memory of the server. As described above, branch data is data branched from trunk data and is a copy of a designated object. The server also stores the data indicating the instruction to change the designated object, in the memory in which the branch data (602) is stored, the data being transmitted by the first client.

In Step 615, the server stores the data indicating the instruction to change the designated object, in the memory in which the trunk data (601) is stored, the data being transmitted by the second client. Based on, for example, the client ID, the server identifies which one of the first client or the second client has transmitted the data indicating the instruction to change the designated object. The server can be configured to store the data in the following manner. If the first client has transmitted the data, the server stores the data in the memory in which the branch data (602) is stored. On the other hand, if the second client has transmitted the data, the server stores the data in the memory in which the trunk data (601) is stored.

In Step 616, the server judges whether or not it is possible to merge two operation sequences together, one of the two operation sequences being an operation sequence according to the change instruction data in the memory in which the trunk data (601) is stored, the other operation sequence being an operation sequence according to the change instruction data in the memory in which the branch data (602) is stored. The judgment uses operational transformation, and the use of operational transformation enables efficient calculations. By using a framework of operational transformation, the comparison in operation sequence between the trunk data (601) and the branch data (602) can be made in real time. If the content of editing by the second user is a subset of the content of editing by the first user, the server judges that the content of the branch data (602) can be merged with the content of the trunk data (601). Then, by using operational transformation, the server applies the operation sequence performed by the first user to the content data of the second user (that is, trunk data (601) in a state after the branch data (602) of the designated object is generated). Subsequently, the server deletes the branch data (602) from the memory. As described above, since the server deletes the branch data (602) from the memory only when the merging is allowed, it is possible to prevent an unnecessary derivation from a file. After the branch data (602) is deleted, the server returns to the process of the trunk data (601).

In Step 617, the server returns to Step 612 to newly monitor whether or not the second user changes the designated object. In other words, the server waits for new designated-object-identifying information.

Figure 7A:
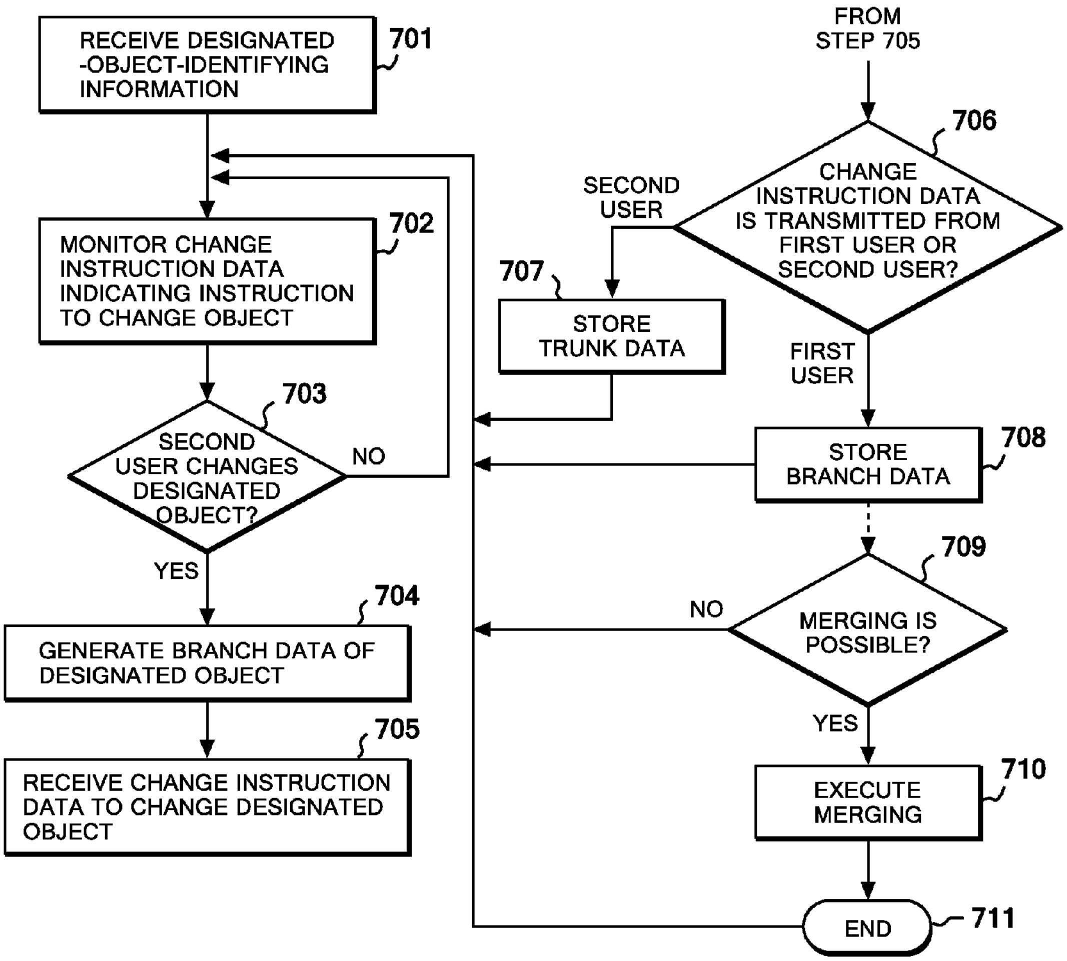
FIG. 7A shows a flow in which collaborative editing of an object in content data is enabled in a server-client system as shown in FIGS. 2A to 2C and 3A, in the embodiment of the present invention.

FIG. 7A shows a flow in which collaborative editing of an object in content data is enabled in a server-client system as shown in FIGS. 2A to 2C and 3A, in the embodiment of the present invention.

A description is given below by taking as an example the case of the system in the server-client environment as shown in FIG. 3A. The description is given on the assumption that, in the server-client environment shown in FIG. 3A, the client (302*a*) is a first client and the client (302*b*) is a second client.

In Step 701, the server generates and stores trunk data of content data to be edited, in the memory of the server. The server receives data from a first client and a second client. If the data indicates a change to an object, the server changes the trunk data in the memory. If the data is designated-object-identifying information, the server regards the client which transmits the data as a first client, and the other client as a second client. The designated object is designated by the first user as an object that the second user is not allowed to edit.

In Step 702, the server monitors change instruction data to change an object in the content data.

(a) If the change instruction data to change the object is change instruction data to change an object other than the designated object, the server changes the trunk data in the memory of the server without judging which one of the first user or the second user has transmitted the change instruction data to change the object.

(b) If the change instruction data to change the object indicates a change to the designated object, the process proceeds to Step 703.

In Step 703, the server judges which one of the first user or the second user has transmitted the change instruction data to change the designated object. The judgment is made by using, for example, client IDs.

(c) If the change instruction data to change the object is transmitted by the first user, the server changes the trunk data. Then, the process returns to Step 702.

(d) If the change instruction data to change the object indicates a change to the designated object and is transmitted by the second user, the process proceeds to Step 704.

In Step 704, in the case of (d) above, the server automatically generates branch data of the designated object in the memory of the server. Note that the branch data is generated for the designated object, not for an object other than the designated object, in order to save memory costs.

In Step 705, the server monitors change instruction data to change the object.

(e) If the change instruction data to change an object is change instruction data to change an object other than the designated object, the server changes the trunk data in the memory of the server without judging which one of the first user or the second user has transmitted the change instruction data to change the object. Then, the process returns to Step 702.

(f) If the change instruction data to change the object is change instruction data to the designated object, the process proceeds to Step 706.

In Step 706, the server judges which one of the first user or the second user has transmitted the change instruction data to change the designated object. The judgment is made by using, for example, client IDs.

(g) If the change instruction data to change the object is transmitted by the second user, the process proceeds to Step 707.

(h) If the change instruction data to change the object is transmitted by the first user, the process proceeds to Step 708.

In Step 707, the server stores the trunk data subjected to an operation sequence according to the change instruction data transmitted from the second user. Then, the process returns to Step 702.

In Step 708, the server stores the branch data subjected to an operation sequence according to the change instruction data transmitted from the first user.

Step 709 is started when a certain time period has elapsed since the branch data is generated or by an instruction of the user (see FIGS. 14 and 15 below). The server judges whether or not it is possible to merge the operation sequence according to the change instruction data to change the trunk data with the operation sequence according to the change instruction data to change the branch data. The judgment uses operational transformation. If the merging is possible, the process proceeds to Step 710. If the merging is not possible, the process returns to Step 702.

In Step 710, according to the judgment that the merging is possible, the server applies, by using operational transformation, the operation sequence performed by the first user to the content data of the second user (that is, trunk data in a state after the branch data of the designated object is generated).

In Step 711, the process is terminated after the merging.

Figure 7B:
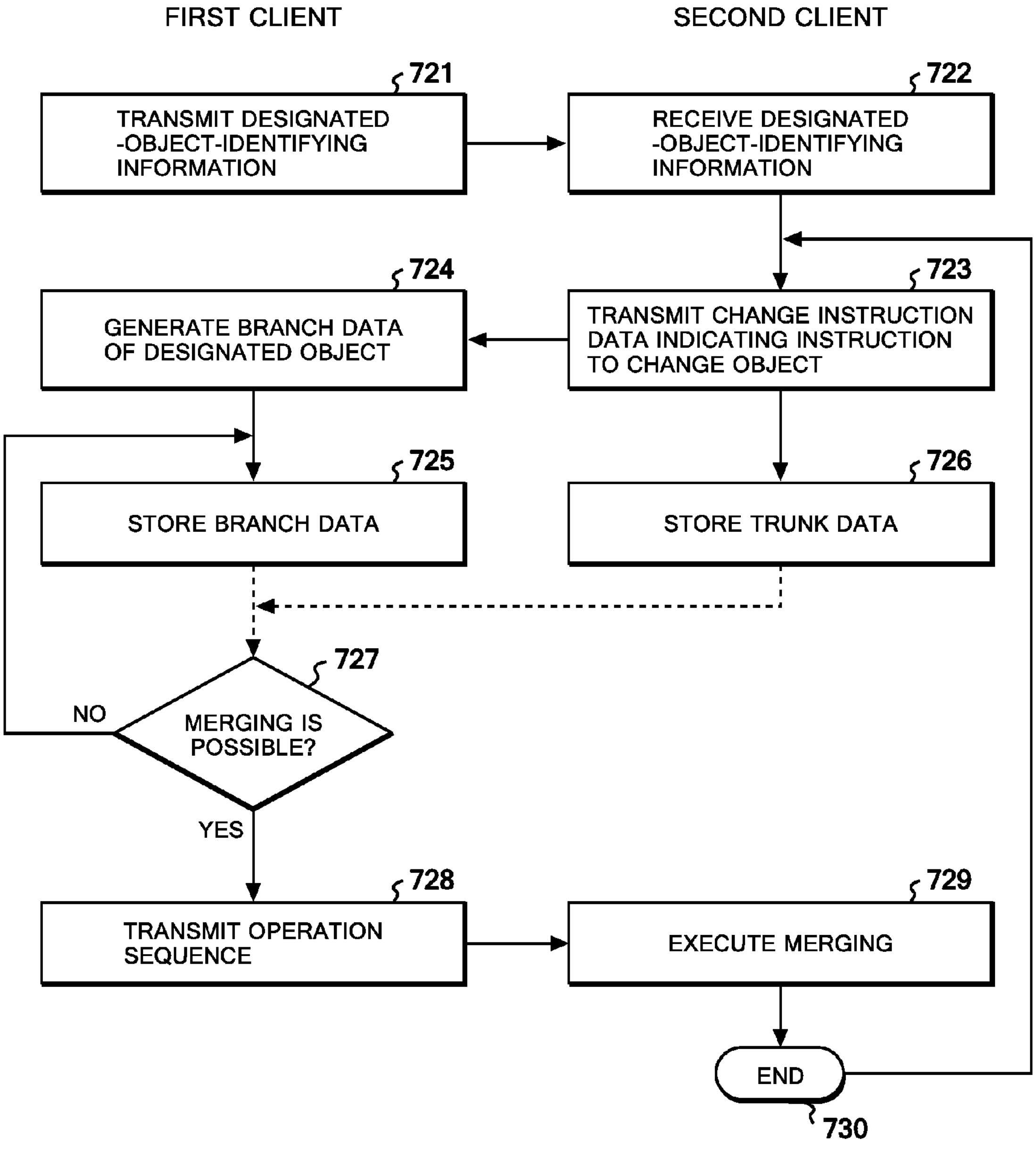
FIG. 7B shows a flow in which collaborative editing of an object in content data is enabled in a client-client system as shown in FIGS. 2D and 3B, in the embodiment of the present invention.

FIG. 7B shows a flow in which collaborative editing of an object in content data is enabled in a client-client system as shown in FIGS. 2D and 3B, in the embodiment of the present invention.

A description is given below by taking as an example the case of the system in the client-client environment shown in FIG. 3B. The description is given on the assumption that, in a client-client environment shown in FIG. 3B, the client (312*a*) is a first client and the client (312*b*) is a second client.

In Step 721, one of the users of the respective first and second clients designates an object that the user does not wish the other users to edit. The client whose user designates the designated object is the first client, and all the other clients are the second clients. The first client transmits designated-object-identifying information to the second client.

In Step 722, the second client receives the designated-object-identifying information from the first client and stores the designated-object-identifying information in the storage of the second client.

In Step 723, after receiving the designated-object-identifying information and when receiving from the second user change instruction data indicating an instruction to change the designated object, the second client transmits the change instruction data to the first client. The change instruction data can be transmitted on the basis of a certain time period, a certain number of change instruction data pieces, or an instruction by the user.

In Step 724, in response to initial reception of the change instruction data from the second client, the first client generates branch data of the designated object in the storage of the first client.

In Step 725, after receiving the designated-object-identifying information, the first client stores the change instruction data in the storage of the first client, the change instruction data indicating an instruction from the first user to change the designated object.

In Step 726, the second client stores the change instruction data sent from the second user in Step 723, in the storage of the second client. Note that the change instruction data can be stored before or at the same time as transmitting the change instruction data to the first client in Step 723.

Step 727 is started when a certain time period has elapsed since the branch data is generated or by an instruction of the first user (see FIGS. 14 and 15 below). Trunk data pieces can be collectively transmitted by the second client to the first client, in response to the judgment of the start of Step 727. Alternatively, each of the trunk data pieces can be transmitted by the second client to the first client every time the trunk data piece is generated. The first client judges whether or not it is possible to merge the operation sequence according to the change instruction data to change the trunk data with the operation sequence according to the change instruction data to change the branch data. The judgment uses operational transformation. If the merging is possible, the process proceeds to Step 728. If the merging is not possible, the process returns to Step 725.

In Step 728, the first client transmits the operation sequence according to change instruction data to change the trunk data to the second client.

In Step 729, according to the judgment that the merging is possible, the second client applies, by using operational transformation, the operation sequence performed by the first user to the content data of the second user (that is, trunk data in a state after the branch data of the designated object is generated). After the application, the second client transmits to the first client a message indicating that the first client can delete the branch data.

In Step 730, after the merging, or in response to reception, from the first client, of a message indicating that the first client has deleted the branch data, the process is terminated.

Figure 7C:
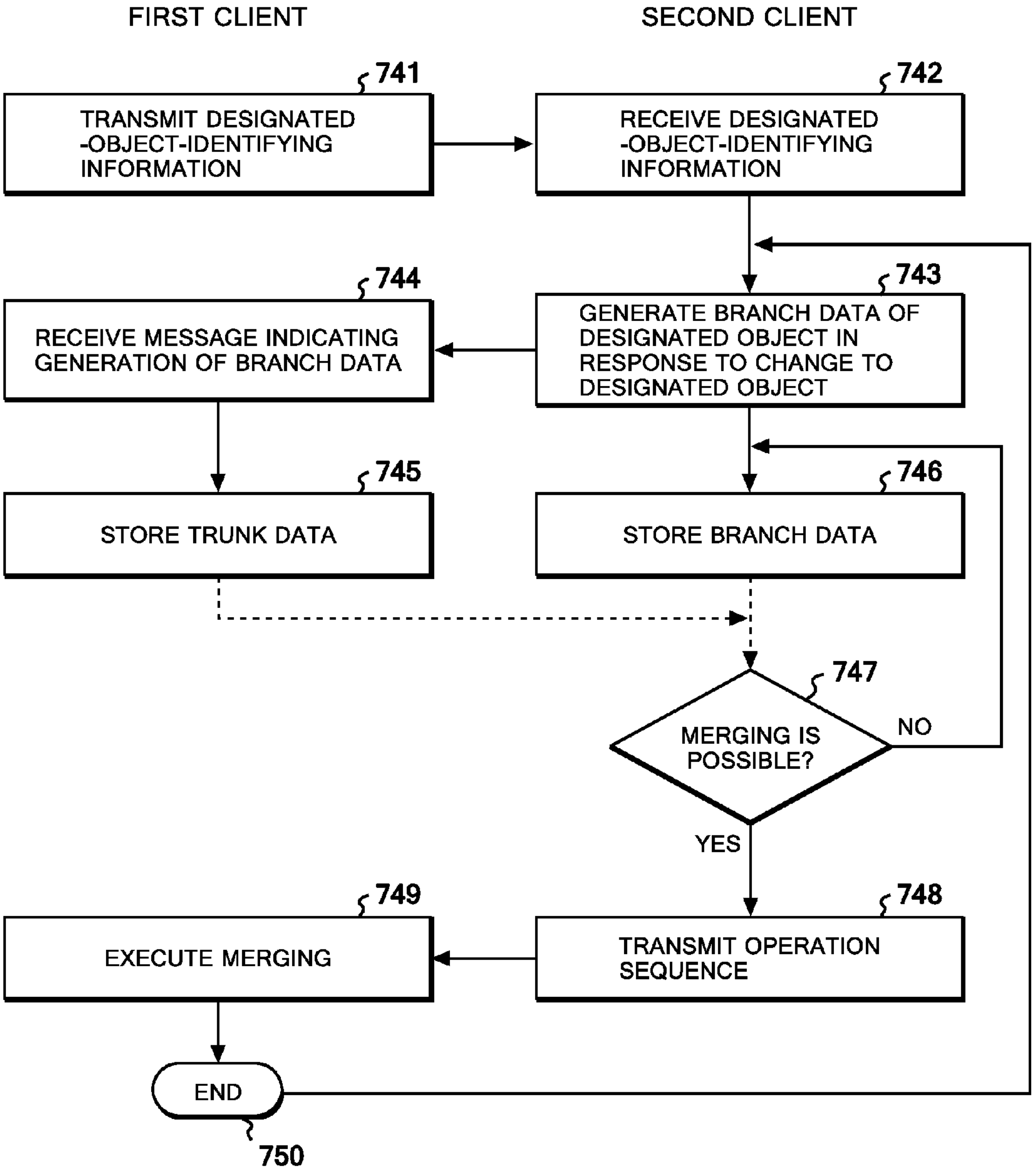
FIG. 7C shows a flow in which collaborative editing of an object in content data is enabled in the client-client system as shown in FIGS. 2D and 3B, in the embodiment of the present invention.

FIG. 7C shows a flow in which collaborative editing of an object in content data is enabled in the client-client system as shown in FIGS. 2D and 3B, in the embodiment of the present invention.

As in the case of FIG. 7B, a description is given below by taking as an example the case of the system in the client-client environment shown in FIG. 3B. The description is given on the assumption that, in a client-client environment shown in FIG. 3B, the client (312*a*) is a first client and the client (312*b*) is a second client.

In Step 741, one of the users of the respective first and second clients designates an object that the user does not wish the other users to edit. The client whose user designates the designated object is the first client, and all the other clients are the second clients. The first client transmits designated-object-identifying information to the second client.

In Step 742, the second client receives the designated-object-identifying information from the first client and stores the designated-object-identifying information in the storage of the second client.

In Step 743, in response to an initial change of the designated object by the second user, the second client generates branch data of the designated object, in the storage of the second client. Then, the second client transmits to the first client a message indicating the second client has generated the branch data of the designated object.

In Step 744, the first client receives the message transmitted in Step 743.

In Step 745, in response to the reception of the message indicating that the second client has generated the branch data, the first client stores change instruction data as trunk data, in the storage of the second client, the change instruction data indicating an instruction to change the designated object by the first user after the time at which the branch data is generated and which is included in the message.

In Step 746, after receiving the designated-object-identifying information, the second client stores the change instruction data in the storage of the second client as a branch data, the change instruction data indicating an instruction from the second user to change the designated object.

Step 747 is started when a certain time period has elapsed since the branch data is generated or by an instruction of the second user (see FIGS. 14 and 15 below). Trunk data pieces can be collectively transmitted by the first client to the second client, in response to the judgment of the start of Step 727. Alternatively, each of the trunk data pieces can be transmitted by the first client to the second client every time the trunk data piece is generated. The second client judges whether or not it is possible to merge the operation sequence according to the change instruction data to change the trunk data with the operation sequence according to the change instruction data to change the branch data. The judgment uses operational transformation. If the merging is possible, the process proceeds to Step 748. If the merging is not possible, the process returns to Step 746.

In Step 748, the second client transmits the operation sequence according to change instruction data to change the branch data to the first client.

In Step 749, according to the judgment that the merging is possible, the first client applies, by using operational transformation, the operation sequence according to the change instruction data of the branch data to the content data of the first user (that is, trunk data in a state after the branch data of the designated object is generated). After the application, the first client transmits to the second client a message indicating that the second client can delete the branch data.

In Step 750, after the merging, or in response to reception, from the second client, of a message indicating that the second client has deleted the branch data, the process is terminated.

FIG. 8 is a flowchart of a comparison process in Step 616 in FIG. 6, which is the embodiment of the present invention.

In Step 801, the server starts comparison between the branch data (602) and the trunk data (601) by applying operational transformation.

In Step 802, by using operational transformation, the server calculates the sequence of all the operations performed by all the second users other than the first user to change the designated object after generation of the branch data (602). Then, the server obtains a result Ht. Ht denotes a sequence of operations performed on the trunk data (601) by all the second users other than the first user.

In Step 803, by using operational transformation, the server calculates the sequence of all the operations performed only by the first user to change the designated object after generation of the branch data (602). Then, the server obtains a result Hb. Hb denotes an operation sequence performed on the branch data (602) only by the first user.

In Step 804, by using operational transformation, the server judges whether or not it is possible to merge the branch data (602) with the trunk data (601). One of conditions for the merging is that Ht is null, Ht being obtained as a result of calculation, using operational transformation, of the whole first operation sequence of Ht obtained after the generation of the branch data (602) of the designated object. Another condition for the merging is that a distance between Ht and Hb is zero, Ht being obtained as a result of calculation, using operational transformation, of the whole first operation sequence of Ht obtained after the generation of the branch data (602) of the designated object, Hb being obtained as a result of calculation, using operational transformation, of the whole first operation sequence of Hb obtained after the generation of the branch data (602) of the designated object. If the distance is not zero, that is, if the merging is not possible, the comparison process proceeds to Step 806 to be terminated.

In Step 805, according to judgment that the merging is possible, the server merges the branch data (602) and the trunk data (601) together (Step 805).

In Step 806, the server terminates the comparison process.

In the method using operational transformation in the comparison, it is not possible to detect cases which are different from ones intended by respective users but are consequently the same. For example, suppose cases where the first character of a character string "ddd" is deleted and where the third character thereof is deleted. These cases should be handled as different from each other. In order to detect the consequently the same result, each of the users (first and second users) compares the branch data (602) and the trunk data (601) by off-line batch processing.

A description is given of definitions to be implemented to add a new operation to an operation sequence.

(1) Onew denotes an operation newly applied to trunk data.

a) Onew in all of operations in Ht has been transformed by operational transformation into an operation which is context equivalent so that contents of the trunk data edited by the users can be synchronized with each other. In addition, Onew has a context preceding relationship with an operation lastly applied to the trunk data.

$$Oi \rightarrow O\text{new},\ 0<i<|Ht|$$

$$O|Ht|-1| \rightarrow O\text{new}$$

b) As for an operation sequence of branch data, since only one user operates the branch data, there is no context equivalent operation. The following relation always holds true $$Oi \rightarrow O\text{new},\ 0<i<|Hb|$$

$$O|Hb|-1| \rightarrow O\text{new}$$

where a new operation for the branch data is Onew. Thus, a description thereof is hereinafter omitted.

(2) An operation sequence Ht for the trunk data is held as follows.

$$Ht=Htd \cdot Hti$$

a) Htd denotes an operation of deleting a character in Ht. When the position for the operation overlaps with a position for a different operation in Ht, the operation has been merged with the different operation. Operations Htd have been sorted in descending order of the character deletion position.

a1) Since the deletion operation has been merged with the operation of Hti at the overlapping position, the deletion operation included in Htd at this time is only a deletion operation to be performed on the original content.

a2) Since the deletion operations Htd have been sorted in descending order of the character deletion position, the positions for the operations in Htd correspond to those in the original content. This is because ET(Htd[i], Htd[i−1])=Htd[i] always holds true.

b) Hti denotes an operation of inserting a character in Ht. When the position for the operation overlaps with a position for a different operation in Ht, the operation has been merged with the different operation. Operations Hti have been sorted in inverse order of the character insertion position.

b1) Since the insertion operations Hti have been sorted in inverse order of the character insertion position, the positions for the operations in Htd correspond to those in the original content. This is because ET(Hti[i], Hti[i−1])=Hti[i] always holds true.

A description is given below of a method for comparing an operation sequence of trunk data and an operation sequence of branch data.

It is simple to make a comparison in color or position of an object between the operation sequences. For example, the comparison can be made by comparing object attributes such as a color or size of the object and then by setting the number of different attributes as a distance as it is.

A description is given below of a comparison in change to text between the operation sequences. For simplicity of the description, the description is given by taking plain text as an example. To extend operational transformation to a general XML is possible by expressing a position O.p at which an operation is applied, by a vector having an integer value. For example, this can be achieved by using a technique described in Aguido Horatio Davis and others, "Generalizing operational transformation to the standard general markup language," Computer Supported Cooperative Work, Proceedings of the 2002 ACM conference on Computer supported cooperative work, ACM, 58-67, 2002, Aguido Horatio Davis and others, "Generalizing operational transformation to the standard general markup language," Computer Supported Cooperative Work, Proceedings of the 2002 ACM conference on Computer supported cooperative work, ACM, 58-67, 2002. If the operation sequences are held in the order of character deletion position and in the order of character insertion position, the operations can be merged to the maximum extent and a resultant operation sequence can be made small. For example, this can be achieved by using a technique described in Haifeng Shen and others, "A Log Compression Algorithm for Operation-based Version Control Systems", COMPSAC, Proceedings of the 26th International Computer Software and Applications Conference on Prolonging Software Life: Development and Redevelopment, IEEE Computer Society, 867-872, 2002, and Haifeng Shen, Chengzheng Sun, "A Log Compression Algorithm for Operation-based Version Control Systems," Computer Software and Applications Conference, Annual International, p. 867, 26th Annual International Computer Software and Applications Conference, 2002.

An operation sequence Ht of the trunk data is expressed by Ht=Htd·Hti where Htd denotes an operation sequence for character deletion and Hti denotes an operation sequence for character insertion. Similarly, an operation sequence Hb of the branch data is expressed by Hb=Hbd·Hbi where Hbd denotes an operation sequence for character deletion and Hbi denotes an operation sequence for character insertion.

Moreover, if the position of an operation of Htd overlaps with the position of an operation of Hti, the operation of Htd is merged with the operation of Hti. Similarly, if the position of an operation of Hbd overlaps with the position of an operation of Hbi, the operation of Hbd is merged with the operation of Hbi. This means that since operations of the sequences for character deletion Htd and Hbd are merged with other operations, remaining operations are only operations of deleting characters in the original content and thus do not include an operation of deleting a character having newly added by an operation of adding the character.

The operation sequences are held in the order of the character deletion position and in the order of the character insertion position but also held by sorting the operation sequences Htd, Hti, Hbd, and Hbi in descending order of the position O.p at which a corresponding operation is applied. How to calculate this will be described as updateH below in detail.

If the operation sequences are sorted in descending order of O.p, the position at which a corresponding operation is applied is not given an impact of the other operations.

Example 1

Case of applying two operation sequences of [O1(1, "abc"), O2(5, "xyz")] to a document having an original content "親譲りの無鉄砲で小供の時から損ばかりしている" (Because of an hereditary recklessness, I have been playing always a losing game since my childhood).

Result 1: "親abc譲xyzりの無鉄砲で小供の時から損ばかりしている"

In Result 1, the operation sequence O2 is inserted at the second-character position in the original content.

Example 2

Case of applying two operation sequences of [O1(5, "VW"), O2(2, "DEF")] to the document having the original content.

Result 2: "親DEF譲りの無VW鉄砲で小供の時から損ばかりしている" "親譲りの無鉄砲で小供の時から損ばかりしている"

The operations of Htd and Hbd precede the insertion operations in the histories. Thus, as long as the operations of Htd and Hbd are sorted in the descending order of the editing position, the position at which a corresponding operation is applied does not have an impact of the other operations. That is, it can be guaranteed that editing operations performed at the same position in trunk data and branch data correspond to editing operations at the same position in the original content. For this reason, the content can be compared between the trunk data and the branch data by comparing the operation sequences thereof.

As for operations of Hti and Hbi, since the operations of Htd and Hbd precede the operations of Hti and Hbi in the histories, editing positions do not match between the operations of Hti and Hbi. If impacts of Htd and Hbd are excluded from Hti and Hbi, the content can be compared also in the insertion operations between the trunk data and the branch data by comparing the operation sequences thereof. How to calculate this will be described as excludeDelete below in detail.

Figure 9:
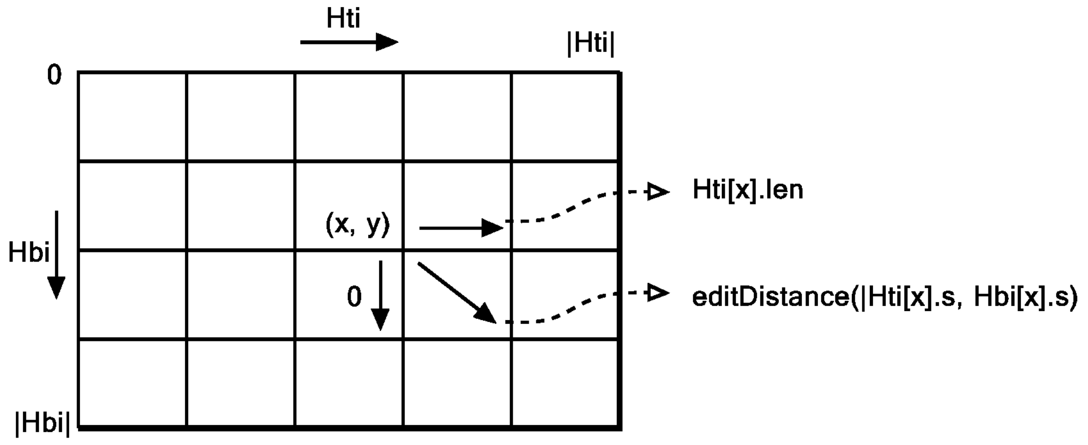
FIG. 9 is a graph showing a difference between contents.

The operation sequences of inserting characters into the respective trunk data and branch data, which are obtained by the above method, are held so that the operation positions of the operation sequences can be regarded as the same as the operation position of the original content. Thus, a difference in content between the trunk data and the branch data can be calculated by a dynamic programming with calculateDistance shown below. FIG. 9 illustrates this.

FIG. 9 is a graph showing a difference between contents.

In order to obtain editDistance, an existing technique of calculating an editing distance between characters is used. A distance between Htd and Hbd is calculated in the same manner as for a distance between Hti and Hbi, and thus a description thereof is omitted.

```
calculateDistance(Hti,Hbi) {
    dist ← 0;
```

-continued

```
        y ← 0;
        for (x = 0; x<|Hti|; x++) {// Check a difference in insertion
operation between trunk data and branch data.
            if (y<|Hbi|) {
                while (Hbi[y].p > Hti[x].p) {// Skip an operation to be
performed at a position having nothing to do with a trunk data operation.
                    y++;
                }
                if (Hti[x].p==Hbi[y].p) {// Edit branch data and trunk
data having the same designated position.
                    dist += editDistance(Hti[x].s, Hbi[y].s); //
Calculate an editing distance between the branch data and the trunk data.
                } else {// There is no same position for the editing in
the branch data as that of the trunk data.
                    dist += Hti[x].len; // The content of editing the
trunk data is a difference as it is.
                }
            } else {// All the operations in the branch data are checked.
                dist += Hti[x].len; // The content of editing the trunk
data is a difference as it is.
            }
        }
        return dist;
    }
```

A difference in content between trunk data and branch data is obtained by adding a distance between character deletion operation sequences and a distance between character insertion operation sequences. How to calculate this will be described as distanceTB below in detail.

A description is given below of updateH.

Specifically, updateH is a function in which a new operation Onew is added to Ht to obtain an operation history Ht'=Htd'·Hti' satisfying the same conditions as for Ht above. A detailed description is given below of updateH(Ht, Onew).

```
  updateH(H, Onew) {
      H'← H·Onew; // Add a new operation to the operation sequence of
trunk data.
      for (i = |H'|-1;i>0; i--) {
          if (H' [i].p≥H' [i-1].p∧H' [i].p≤H'[i-1].p+ H' [i-1].len) {// If the
editing position of the operation overlaps with the position of the new
operation,
              (H' [i], H' [i-1]) = MERGE(H' [i], H' [i-1]); // merge the
operations together.
          }
          if (H'[i-1].t = del∧H'[i-1].p < H'[i-2].p){
              break; // There is no more operation to be merged
with the new operation.
          } else {
              (H'[i], H'[i-1]) = SWAP(H'[i], H'[i-1]); // Move the new
operation forward in the array to check if any operation can be merged with
the new operation.
          }
      }
      Onew' ← H' [i];// A new operation obtained after merging with the
mergeable operation in the history is an i-th operation.
      if (Onew'.t = ins) {// If Onew' is an insertion operation, Onew' is
moved to an appropriate position in Hi.
          while (H[i+1].t = del∨H[i+1].p>H[i].p) {
              (H'[i], H'[i+1]) = SWAP(H'[i], H'[i+1]); // Move the new
operation backward in the array until the new operation is properly merged
at the operation position thereof.
              i++;
          }
      } else {
          // If Onew' is a deletion operation, it has been sorted already.
      }
      return H';
  }
```

A description is given below of excludeDelete.

The editing positions of the operation sequences of Hti and Hbi for insertion in the operation sequences of Ht and Hb of the trunk data and the branch data have impacts of the operation sequences of Htd and Hbd. The impacts of the operation sequences of Htd and Hbd are excluded by making the following calculation for the operation sequences of Hti and Hbi.

```
excludeDelete(Hi, Hd) {
    Hi' ← Hi;
    for (i = 0; i<|Hi|; i++) {
        for (j = 0; j<|Hd|; j++) {
            Hi'[i] = ET(Hi'[i],Hj[j]);
        }
    }
    return Hi';
}
```

A description is given below of calculateDistance.

A content distance between the trunk data and the branch data can be calculated by using calculateDistance as described below as a sum of a distance between Htd and Hbd and a distance between Hti and Hbi.

```
distanceTB(Ht,Hb) {
    dist ← 0;
    dist += calculateDistance(Htd, Hbd);
    Hti' ← excludeDelete(Hti, Htd);
    Hbi' ← excludeDelete(Hbi, Hbd);
    dist += calculateDistance(Hti', Hbi');
return dist;
}
```

FIGS. 10 to 13 each show an example of merging trunk data and branch data.

Figure 10:
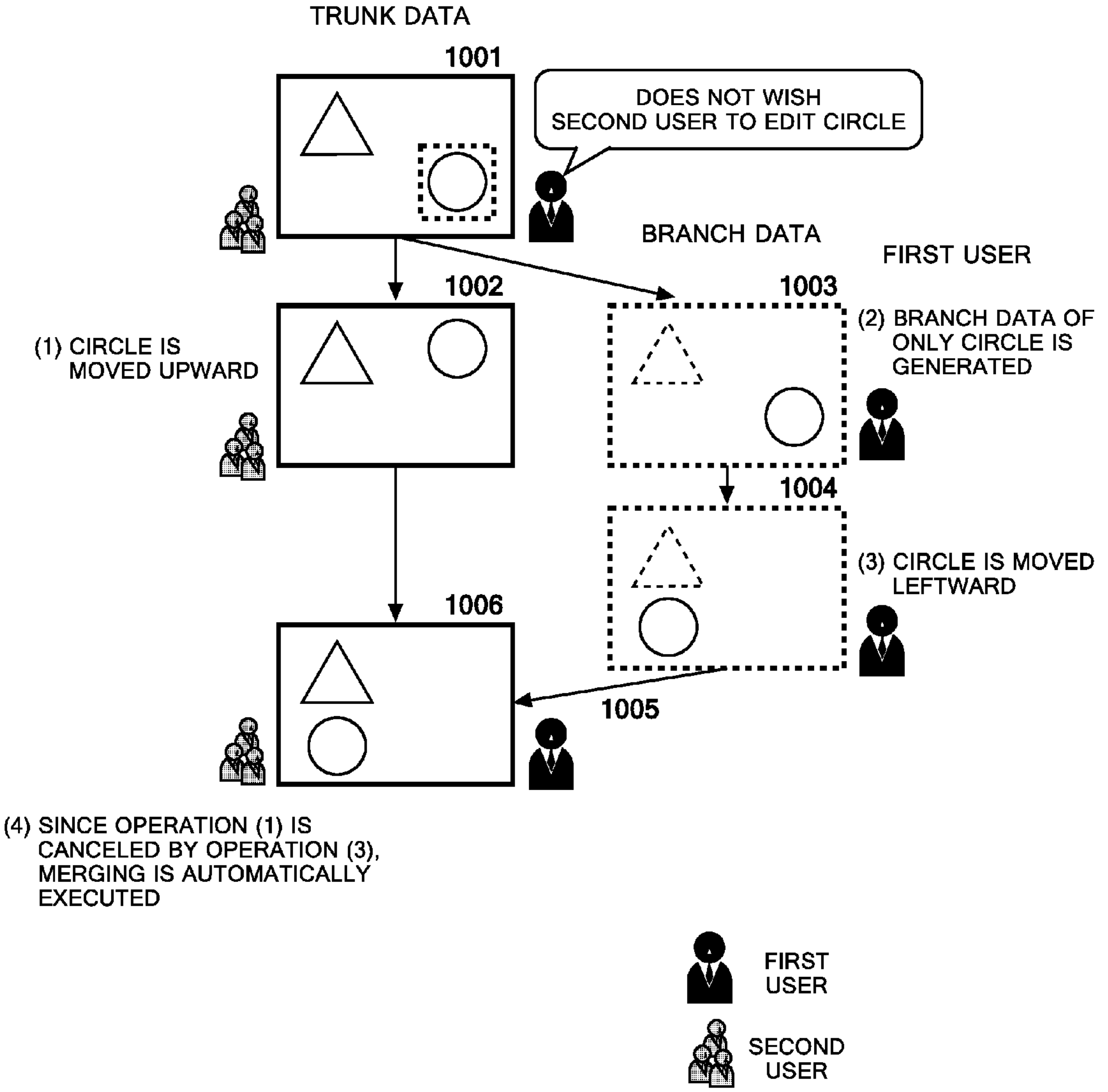
FIG. 10 shows an example of merging performed in a case where a designated object is a figure, which is the embodiment of the present invention.

FIG. 10 shows an example of merging performed in a case where a designated object is a figure, which is the embodiment of the present invention.

FIG. 10 shows trunk data having multiple figures (a triangle and a circle) drawn thereon.

The first user does not wish any other user to edit the figure of the circle and thus selects the circle as a designated object in Step 1001.

In Step 1002, the second user moves upward the circle which is the designated object [Operation (1)].

In Step 1003, in response to the moving of the designated object by the second user, branch data of only the circle is generated in the buffer [Operation (2)].

In Step 1004, the first user moves the circle to the left [Operation (3)].

In Step 1005, operational transformation is applied to judge whether or not it is possible to merge the trunk data with the branch data.

In Step 1006, if the merging is possible, Operation (1) is cancelled by (merged with) Operation (3) and thus the circle is moved to the left. Then, the branch data is deleted from the buffer.

Figure 11:
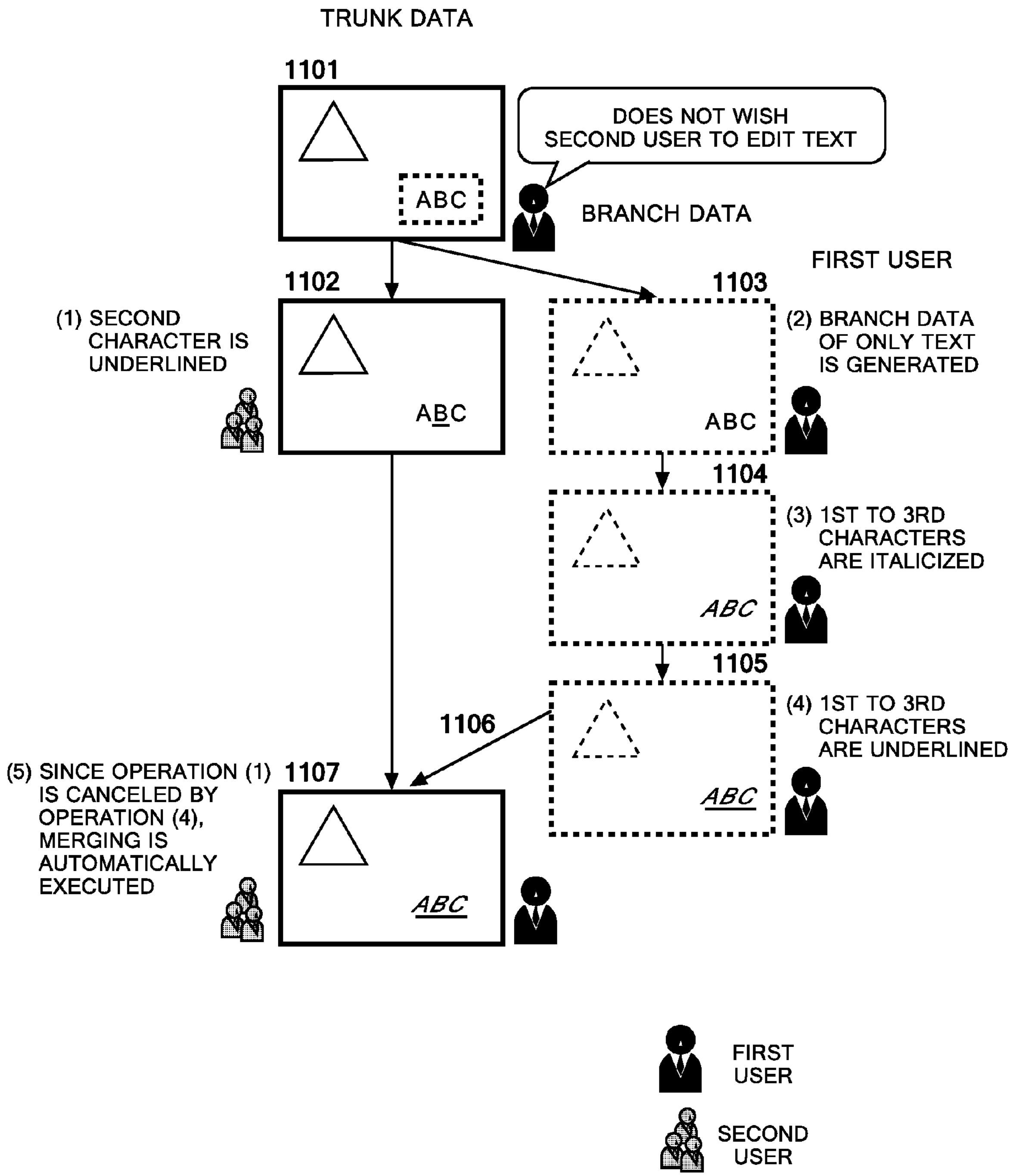
FIG. 11 shows an example of merging performed in a case where a designated object is text, which is the embodiment of the present invention.

FIG. 11 shows an example of merging performed in a case where a designated object is text, which is the embodiment of the present invention.

FIG. 11 shows trunk data having a figure (triangle) and text (ABC).

In Step 1101, the first user does not wish any other user to edit the text "ABC" and thus selects "ABC" as a designated object.

In Step 1102, the second user underlines the second character "B" in "ABC" which is the designated object [Operation (1)].

In Step 1103, in response to the editing of the designated object by the second user, branch data of only "ABC" is generated in the buffer [Operation (2)].

In Step 1104, the first user italicizes the first to third characters [Operation (3)].

In Step 1105, the first user underlines the first to third characters [Operation (4)].

In Step 1106, OPERATIONAL TRANSFORMATION is applied to judge whether or not it is possible to merge the trunk data with the branch data.

In Step 1107, if the merging is possible, Operation (1) is cancelled by (merged with) Operation (4). As a result, "ABC" is italicized and underlined. Then, the branch data is deleted from the buffer [Operation (5)].

Figure 12:
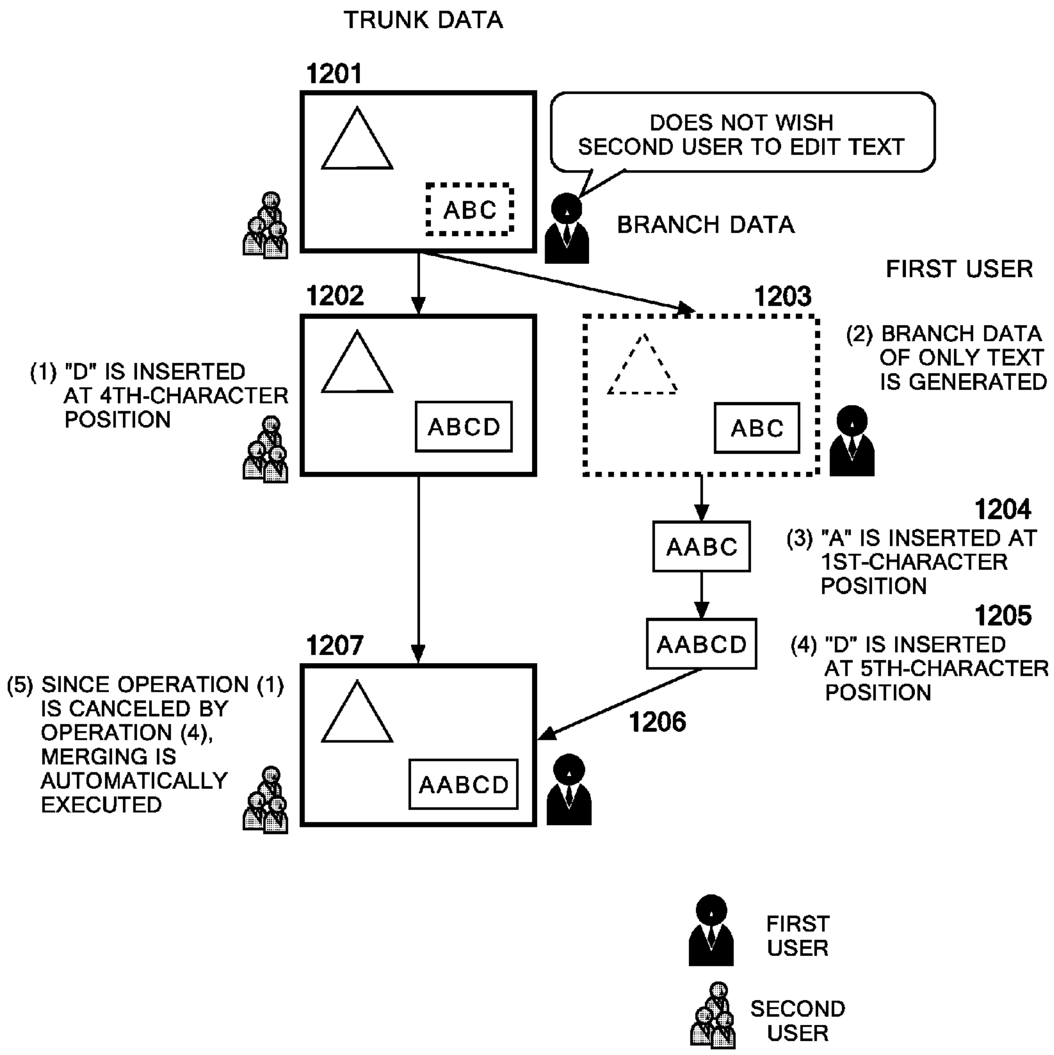
FIG. 12 shows an example of merging performed in a case where a designated object is text, which is the embodiment of the present invention.

FIG. 12 shows an example of merging performed in a case where a designated object is text, which is the embodiment of the present invention.

FIG. 12 shows trunk data having a figure (triangle) and text "ABC."

The first user does not wish any other user to edit the text "ABC" and thus selects "ABC" as a designated object in Step 1201.

In Step 1202, the second user performs an operation of inserting "D" at the fourth-character position, and thus "D" is inserted at the fourth-character position of "ABC" which is the designated object [Operation (1)].

In Step 1203, in response to editing the designated object by the second user, branch data of only "ABC" is generated in the buffer [Operation (2)].

In Step 1204, the first user performs an operation of inserting "A" at the first-character position, and thus "A" is inserted at the first-character position of "ABC" which is the designated object [Operation (3)].

In Step 1205, the first user performs an operation of inserting "D" at the fifth-character position, and thus "D" is inserted at the fifth-character position of "AABC" [Operation (4)].

In Step 1206, operational transformation is applied to judge whether or not it is possible to merge the trunk data with the branch data.

In Step 1207, if the merging is possible, Operation (1) is cancelled by (merged with) Operation (4). As a result, "A" is inserted at the first-character position of "ABC," and "D" is inserted at the fifth-character position of "AABC." These operations result in "AABCD." Then, the branch data is deleted from the buffer.

Figure 13:
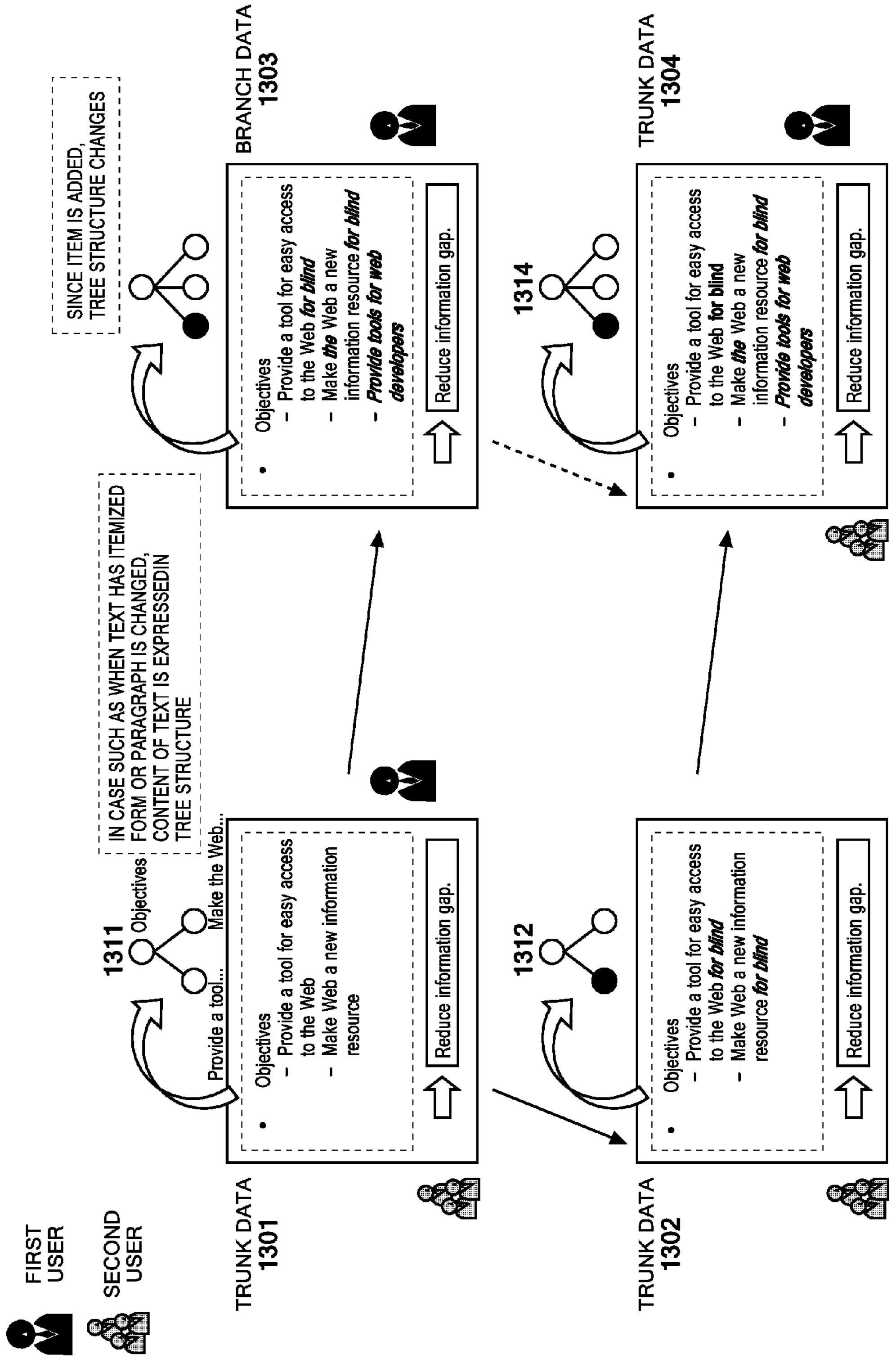
FIG. 13 shows an example of merging performed in a case where a designated object is complicated text, which is the embodiment of the present invention.

FIG. 13 shows an example of merging performed in a case where a designated object is complicated text, which is the embodiment of the present invention.

FIG. 13 shows trunk data having: a title "Objectives"; text "—Provide a tool for easy access to the Web" (hereinafter, referred to as "Text 1") and "—Make Web a new information resource (hereinafter, referred to as "Text 2") which are located under the title "Objectives"; a figure (arrow); and text "Reduce information gap."

The first user does not wish any other user to edit the title "Objectives" and text located under the title and thus selects the title "Objectives" as a designated object in Step 1301. Note that selecting the title "Objectives" means that the first user does not wish any other user to edit the text under the title, either.

In Step 1302, the second user edits the designated object. The second user inserts a character string "for blind" at the end of each of the Text 1 and Text 2 located under the title "Objectives."

In Step 1303, in response to the editing of the designated object by the second user in Step 1302, branch data of only the title "Objectives" and the text under the title is generated in the storage.

Then, the first user inserts a character string "for blind" at the end of Text 1 under the title "Objective" and a character string "for blind" at the end of Text 2, inserts a word "the" in Text 2 between the first word "Make" and the second word "Web", and inserts a character string "provide tool for web developers" as Text 3 following Text 2.

In Step 1304, operational transformation is used to judge whether or not it is possible to merge the trunk data (1302) with the branch data (1303). As a result, it is judged that the merging is possible. Accordingly, an operation sequence of the first user is applied, by using operational transformation, to the trunk data (1302) which is an operation sequence of the second user.

A tree structure (1311) is provided based on the trunk data which is in a state before the branch data is generated. Text 1 and Text 2 under the title "Objectives" can be expressed in a tree structure. That is, the title "Objectives" is a parent node, and Text 1 and Text 2 are child nodes of the parent node.

A tree structure (1312) is provided based on the trunk data which is in a state after the branch data is generated. Text 1, Text 2, and Text 3 under the title "Objectives" can be expressed in a tree structure. In Step 1302, the character string "for blind" is added to each of Text 1 and Text 2. The tree structure (1312) in Step 1302, however, has no change in both the parent node and child nodes, from the tree structure (1311) in Step 1302.

A tree structure (1313) is provided based on the branch data. Text 1 and Text 2 under the title "Objectives" can be expressed in a tree structure. Since Text 3 is added in Step 1303, a child node as Text 3 in the first layer is added in the tree structure (1313) obtained in Step 1303, to the tree structure (1311) obtained in Step 1301.

A tree structure (1314) is provided based on the trunk data. Text 1, Text 2, and Text 3 under the title "Objectives" can be expressed in a tree structure. When being compared with each other, the trunk data (1302) and the branch data (1303) have the same Text 1. Thus, Text 1 of the trunk data (1302) and Text 1 of the branch data (1303) can be merged together.

By calculating a difference between operation sequences for the tree structure (1312) of the trunk data and the tree structure (1313) of the branch data, a difference in content between the trunk data and branch data can be obtained.

Figure 14:
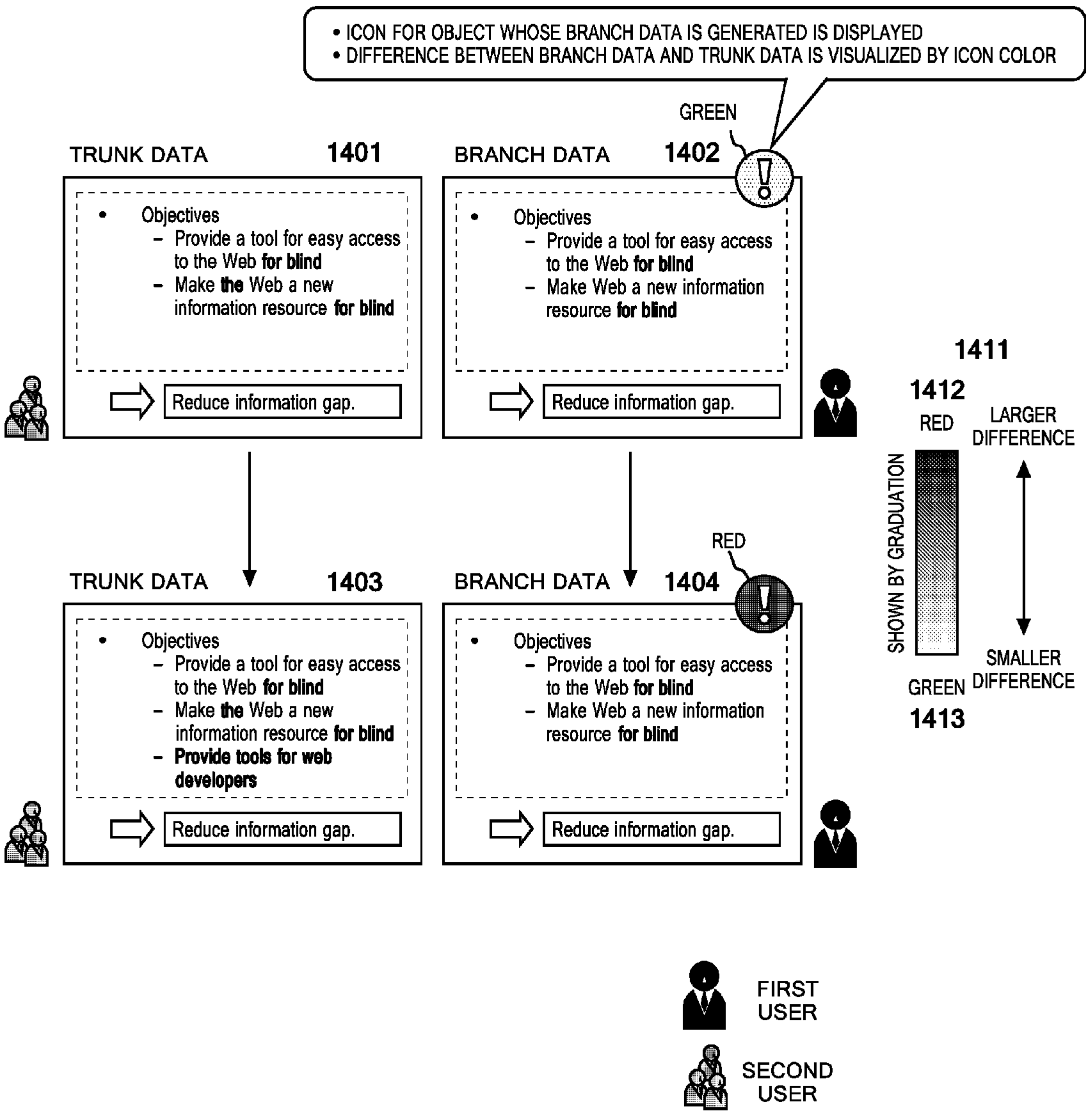
FIG. 14 shows an example of a user interface prompting for merging on the basis of a difference between operation sequences performed on trunk data and branch data, which is the embodiment of the present invention.
Figure 15:
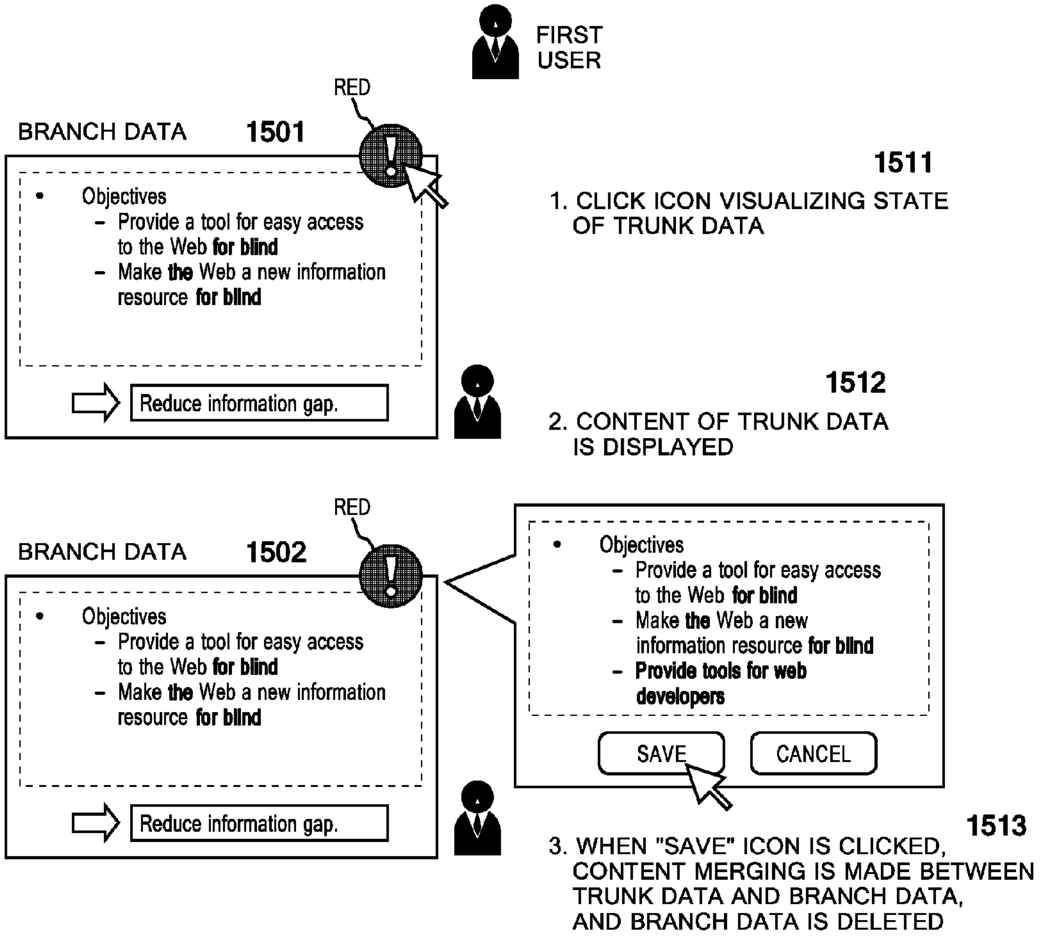
FIG. 15 shows an example of a user interface visualizing the state of branch data to prompt for merging, which is the embodiment of the present invention.

FIGS. 14 and 15 each show an example of a user interface which prompts for merging between trunk data and branch data, and which is the embodiment of the present invention.

FIG. 14 shows an example of a user interface prompting for merging on the basis of a difference between operation sequences for trunk data and branch data, which is the embodiment of the present invention.

Reference numeral 1411 denotes an indicator of the magnitude of a difference between operation sequences for trunk data and branch data, the indicator using graduation. The graduation can be designed to have a larger proportion of red hue to show a larger difference and have a larger proportion of green hue to show a smaller difference.

An original content of the trunk data and the branch data is the same as in 1301 in FIG. 13, and thus there are Text 1 and Text 2 under the title "Objectives."

In trunk data (1401), the following operations are performed on the original content. Specifically, a character string "for blind" is inserted at the end of Text 1 under the title "Objectives"; a word "the" is inserted in Text 2 between the first word "Make" and the second word "Web"; and a character string "for blind" is inserted at the end of Text 2.

In branch data (1402), the following operations are performed on the original content. Specifically, a character string "for blind" is inserted at the end of Text 1 under the title "Objectives"; and a character string "for blind" is inserted at the end of Text 2.

Accordingly, there is a small difference in content between the trunk data (1402) and the branch data (1402), the difference being obtained by O operational transformation. Hence, an icon showing the magnitude of the difference is displayed near an object for which the branch data (1402) is generated or in a form of a balloon. Moreover, the icon is displayed in green. The user can judge that merging is not required yet because of the green color of the icon.

Trunk data (1403) has "provide tool for web developers" inserted therein as Text 3 in comparison with the trunk data (1401).

Branch data (1404) has the same content as the trunk data (1402).

Accordingly, there is a large difference in content between the trunk data (1403) and the branch data (1404). Hence, an icon showing the magnitude of the difference is displayed near an object for which the branch data (1404) is generated or in a form of a balloon. Moreover, the icon is displayed in red. The user can judge that merging is required because of the red color of the icon.

The difference in content can be calculated by using the dynamic programming as in calculateDistance described above.

In a case where the difference in content is particularly small, provision of the aforementioned user interface which prompts for the merging can promote the merging.

FIG. 15 shows an example of a user interface visualizing the state of branch data to prompt for merging, which is the embodiment of the present invention.

An original content of the trunk data and the branch data is the same as in 1301 in FIG. 13, and thus there are Text 1 and Text 2 under the title "Objectives."

In branch data (1501), the following operations are performed on the original content. Specifically, a character string "for blind" is inserted at the end of Text 1 under the title "Objectives"; and a character string "for blind" is inserted at the end of Text 2.

Branch data (1502) has the same content as in the branch data (1501).

In trunk data (1503), the following operations are performed on the original content. Specifically, a character string "for blind" is inserted at the end of Text 1 under the title "Objectives"; a word "the" is inserted in Text 2 between the first word "Make" and the second word "Web"; a character string "for blind" is inserted at the end of Text 2; and a character string "provide tool for web developers" is inserted as Text 3 following Text 2.

In Step 1511, the first user (the user who designates an object that the user does not wish any other user to edit) is looking at the content of the branch data (1501). The first user clicks an icon which visualizes the state of trunk data. The icon can be displayed, for example, near the designated object or in a form of a balloon.

In Step 1512, the content of the trunk data (1503) is displayed on the monitor display of the first user. The content of the trunk data (1503) can be displayed near the branch data (1502) or in a form of a balloon, for example. The monitor display of the first user can be provided with an icon capable of prompting whether or not to make merging between the branch data (1502) and the trunk data (1503) as well as capable of displaying the content of the trunk data (1503). The icon is, for example, a "save" or "cancel" icon. The "save" icon prompts for the merging between the branch data (1502) and the trunk data (1503), while the "cancel" icon prompts for not merging therebetween.

In Step 1513, when the first client clicks the icon "save" to apply an operation sequence of the branch data (1502) to the trunk data (1503), the merging of content is made between the branch data (1502) and the trunk data (1503). Then, the branch data (1502) is deleted from the buffer.

What is claimed is:

1. A computer implemented method for a server to enable an object in content data to be edited collaboratively, the method comprising:

- receiving information identifying a designated object from a first client in response to a designation of an object made by a first user as an object that a second user is not allowed to edit;
- receiving change instruction data from a second client and storing the received change instruction data in a storage of the server, the change instruction data indicating an instruction to change the designated object by the second user;
- generating branch data of the designated object in response to reception of the change instruction data from the second client, the branch data comprising a copy of the designated object;
- receiving change instruction data indicating an instruction to change the designated object by the first user from the first client;
- storing the received change instruction data in the storage;
- updating the branch data by reflecting an operation according to the change instruction data received from the first client;
- judging, by using operational transformation, whether it is possible to merge a first sequence of operations according to the change instruction data received from the first client, with a second sequence of operations according to the change instruction data received from the second client; and
- applying the first operation sequence to the content data of the second user by using operational transformation if the merging is possible,
- wherein at least one of the steps is carried out by a computer device,
- wherein after the generation of the branch data of the designated object, the branch data and the change instruction data from the first client are stored in a first buffer of the storage, and the change instruction data from the second client is stored in a second buffer in the storage.

2. The computer implemented method according to claim 1, wherein the merging is possible when Ht is null, Ht being a result of calculating by using operational transformation the whole second operation sequence obtained after the generation of the branch data of the designated object.

3. The computer implemented method according to claim 1, wherein the merging is possible when a distance between Ht and Hb is zero, wherein Ht is a result of calculating, by using operational transformation, the whole second operation sequence obtained after the generation of the branch data of the designated object, and wherein Hb is a result of calculating, by using operational transformation, the whole first operation sequence obtained after the generation of the branch data of the designated object.

4. The computer implemented method according to claim 1, further comprising the step of deleting from the storage the branch data and the change instruction data received from the first client after the step of applying the first operation sequence.

5. The computer implemented method according to claim 1, wherein the judging comprises providing data on a magnitude of a difference between the first operation sequence and the second operation sequence to a user interface for showing the first user the magnitude of the difference.

6. The computer implemented method according to claim 1, further comprising:

- receiving change instruction data from the first client before the designated object is designated, the change instruction data indicating an instruction to change the object by the first user; and
- updating the content data of the second user for synchronization by using the received change instruction data.

7. A computer implemented method for enabling an object in content data to be edited collaboratively by a first client associated with a first user and a second client associated with a second user, the first client including a first storage that stores change instruction data indicating an instruction to change the object by the first user, the second client including a second storage that stores change instruction data indicating an instruction to change the object by the second user, the method comprising:

- receiving information identifying the designated object from the first client in response to a designation of an object made by the first user as an object that the second user is not allowed to edit;
- storing change instruction data in the second storage after receiving the information identifying the designated object, the change instruction data indicating an instruction to change the designated object by the second user;
- transmitting the change instruction data from the second client to the first client;
- generating, by the first client, branch data of the designated object in the first storage in response to initial reception of the change instruction data from the second client, the branch data comprising a copy of the designated object;
- storing change instruction data indicating an instruction to change the designated object by the first user in the first storage;
- updating the branch data by reflecting an operation according to the change instruction data received from the first client;
- judging whether it is possible to merge a first operation sequence according to the change instruction data received from the first client, with a second operation sequence according to the change instruction data received from the second client by using operational transformation;
- when the merging is possible, transmitting the first operation sequence to the second client; and
- applying, by the second client, the first operation sequence to the content data of the second user by using operational transformation in response to reception of the first operation sequence,
- wherein after the generation of the branch data of the designated object, the branch data and the change instruction data from the first client are stored in a first buffer of the storage, and the change instruction data from the second client is stored in a second buffer in the storage.

8. The computer implemented method according to claim 7, further comprising the first client deleting the branch data after the step of transmitting the first operation sequence to the second client.

9. A computer implemented method for enabling an object in content data to be edited collaboratively by a first client associated with a first user and a second client associated with a second user, the first client including a first storage that stores change instruction data indicating an instruction to change the object by the first user, the second client including a second storage that stores change instruction data indicating an instruction to change the object by the second user, the method comprising:

receiving information identifying the designated object from the first client in response to a designation of an object made by the first user as an object that the second user is not allowed to edit;

storing change instruction data in the second storage, indicating an instruction to change the designated object by the second user;

generating branch data of the designated object in the second storage in response to initial generation of an instruction to change the designated object by the second user, the branch data comprising a copy of the designated object;

updating the branch data by reflecting an operation according to the change instruction data;

sending the first client data indicating that the designated object is changed in response to the initial generation of the instruction to change the designated object by the second user;

sending, by the first client, the second client change instruction data indicating the instruction to change the designated object by the first user, in response to reception of the data indicating that the designated object is changed;

judging, by the second client using operational transformation, whether it is possible to merge a first operation sequence according to the change instruction data received from the first client, with a second operation sequence according to the change instruction data received from the second client; and when the merging is possible, transmitting the first operation sequence to the first client, applying, by the first client using operational transformation, the first operation sequence transmitted from the second client to the content data of the second user, wherein after the generation of the branch data of the designated object, the branch data and the change instruction data from the first client are stored in a first buffer of the storage, and the change instruction data from the second client is stored in a second buffer in the storage.

10. The computer implemented method according to claim 9, further comprising the second client deleting the branch data after the step of applying the first operation sequence.

11. The computer implemented method according to claim 7, further comprising the steps executed by the first user of:

displaying the content data edited by the second user in response to an instruction by the first user to display the content data edited by the second user; and showing the first user a magnitude of a difference between the first operation sequence and the second operation sequence, wherein the step of applying the first operation sequence is executed in accordance with an instruction by the first user.

12. The computer implemented method according to claim 7, wherein the first client and the second client are virtual client computers, and a single computer implements the first client and the second client.

13. A server which enables an object in content data to be edited collaboratively, the server being connectable through a network to a first client associated with a first user and a second client associated with a second user, the server comprising:

a memory having computer readable computer instructions; and a processor for executing the computer readable instructions, the instruction including:

receiving, in response to a designation of an object made by the first user as an object that the second user is not allowed to edit, information identifying the designated object from the first client;

receiving, from the second client after the reception of the information identifying the designated object, change instruction data indicating an instruction to change the designated object by the second user;

generating branch data of the designated object in response to reception of the change instruction data from the second client, the branch data comprising a copy of the designated object;

receiving, from the first client after the reception of the information identifying the designated object, change instruction data indicating an instruction to change the designated object by the first user, storing the change instruction data received from the second client, the change instruction data received from the first client, and the branch data, and to update the branch data by reflecting an operation according to the change instruction data received from the first client;

judging, by using operational transformation, whether it is possible to merge a first operation sequence according to the change instruction data received from the first client, with a second operation sequence according to the change instruction data received from the second client; and applying the first operation sequence to the content data of the second user by using operational transformation when the merging is possible, wherein after the generation of the branch data of the designated object, the branch data and the change instruction data from the first client are stored in a first buffer of the storage, and the change instruction data from the second client is stored in a second buffer in the storage.

14. The server according to claim 13, wherein the merging is possible when Ht is null, wherein Ht is a result of calculating, by using operational transformation, the second operation sequence obtained after the generation of the branch data of the designated object.

15. The server according to claim 13, wherein the merging is possible when a distance between Ht and Hb is zero, wherein Ht is a result of calculating, by using operational transformation, the second operation sequence obtained after the generation of the branch data of the designated object, and wherein Hb is a result of calculating, by using operational transformation, the first operation sequence obtained after the generation of the branch data of the designated object.

16. The server according to claim 13, wherein the instruction further comprise deleting, from the storage, the branch data and the change instruction data received from the first client, after the application of the first operation sequence.

17. The server according to claim 13, wherein the instruction further comprise providing data on a magnitude of a difference between the first operation sequence and the second operation sequence to a user interface for showing the first user the magnitude of the difference.

18. The server according to claim 13, wherein change instruction data indicating an instruction to change the object by the first user is received before the designated object is designated; and the content data of the second user is synchronized by using the received change instruction data.

* * * * *